(12) United States Patent
Samwel et al.

(10) Patent No.: US 12,353,843 B2
(45) Date of Patent: *Jul. 8, 2025

(54) EFFICIENT MERGE OF TABULAR DATA USING A PROCESSING FILTER

(71) Applicant: Databricks, Inc., San Francisco, CA (US)

(72) Inventors: Bart Samwel, Oegstgeest (NL); Tathagata Das, New Haven, CT (US); Lars Kroll, Almere (NL); Yijia Cui, Sunnyvale, CA (US); Juliusz Sompolski, Amsterdam (NL); Tom Van Bussel, Amsterdam (NL)

(73) Assignee: Databricks, Inc., San Francisco, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/895,872

(22) Filed: Aug. 25, 2022

(65) Prior Publication Data

US 2024/0069863 A1    Feb. 29, 2024

(51) Int. Cl.
*G06F 16/00* (2019.01)
*G06F 7/14* (2006.01)
*G06F 16/14* (2019.01)
*G06F 16/16* (2019.01)

(52) U.S. Cl.
CPC .............. *G06F 7/14* (2013.01); *G06F 16/148* (2019.01); *G06F 16/16* (2019.01)

(58) Field of Classification Search
CPC ................................ G06F 7/14; G06F 16/148
USPC ......................................................... 707/737
See application file for complete search history.

(56) References Cited

U.S. PATENT DOCUMENTS

| | | | |
|---|---|---|---|
| 7,188,334 B1* | 3/2007 | Sinclair | G06F 16/2456 707/999.1 |
| 10,977,251 B1* | 4/2021 | Gibas | G06F 16/282 |
| 2018/0068008 A1* | 3/2018 | Cruanes | G06F 16/211 |
| 2018/0081946 A1* | 3/2018 | Bondalapati | G06F 16/2456 |
| 2020/0142987 A1* | 5/2020 | Grabs | G06F 16/2456 |
| 2021/0124742 A1* | 4/2021 | Ahmed | G06F 16/24539 |
| 2022/0318243 A1* | 10/2022 | Donjerkovic | G06F 16/2456 |

* cited by examiner

*Primary Examiner* — Monica M Pyo
(74) *Attorney, Agent, or Firm* — Fenwick & West LLP

(57) ABSTRACT

A method, system, and computer system for performing an operation with respect to a target table are disclosed. The method includes performing first, second and a third jobs, and obtaining a resulting table based at least in part on the second job resulting file(s) and third job resulting file(s). Performing the first job includes determining a set of matching target table files and storing target table information indicating for each of the set of matching target table files, a particular set of rows having matching rows. Performing the second job includes performing a matching action based on matched rows and obtaining the second job resulting file(s). Performing the third job includes determining unmatched rows for target table files and storing the unmatched rows in third job resulting file(s).

19 Claims, 18 Drawing Sheets

400

EFFICIENT MERGE OF TABULAR DATA USING A PROCESSING FILTER

BACKGROUND OF THE INVENTION

A system for big data processing comprises a system for deployments of applications, configurations, one or more datasets, and model(s) used in connection with analyzing the data. Updating datasets at scale is very computationally expensive and takes significant amount of time to complete.

BRIEF DESCRIPTION OF THE DRAWINGS

Various embodiments of the invention are disclosed in the following detailed description and the accompanying drawings.

DETAILED DESCRIPTION

Figure 1:
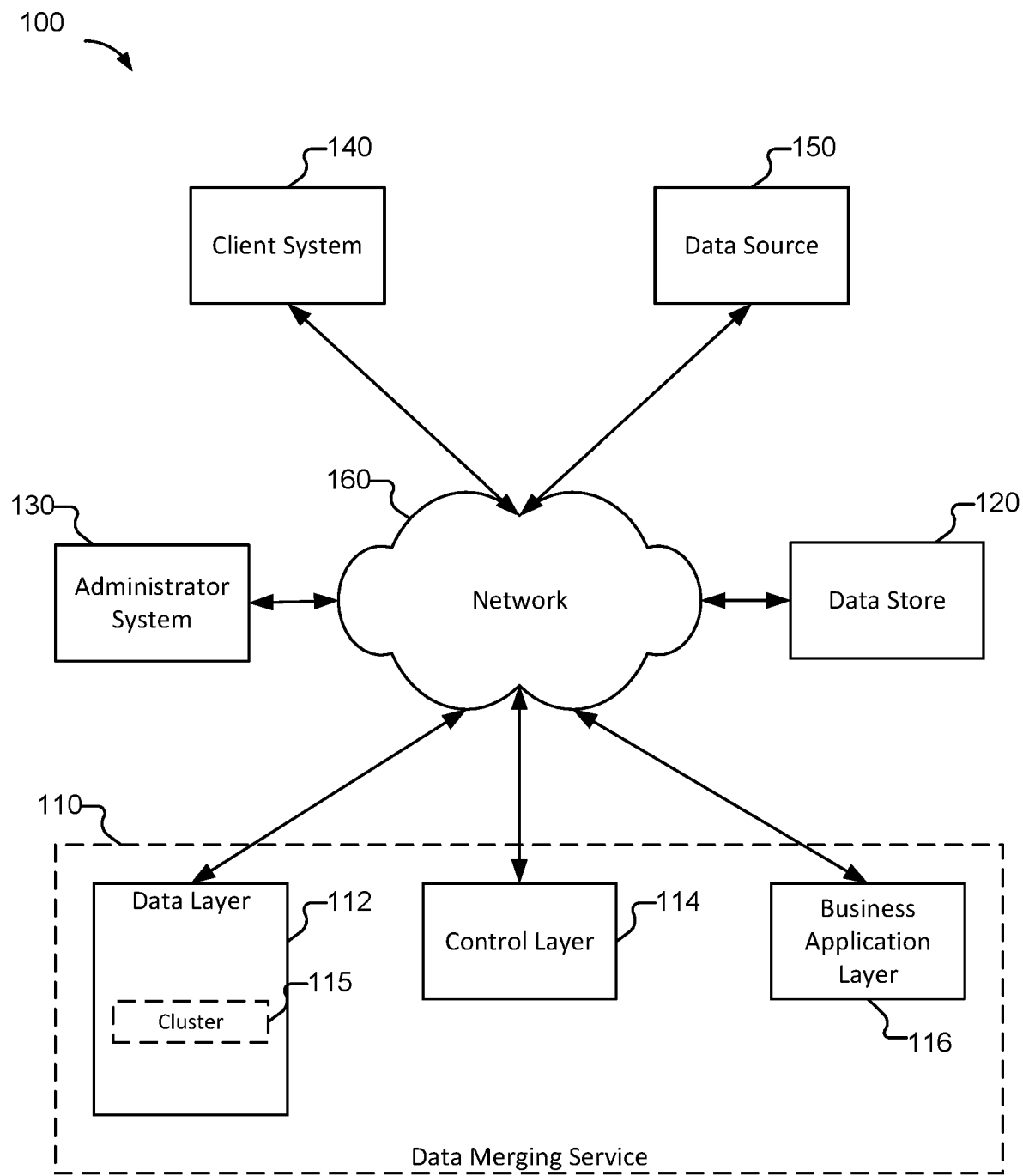
FIG. 1 is a block diagram of a system for merging data according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a target table is a table of data corresponding to existing data that can be modified using source data. The target table may have a plurality of files and each file can include one or more records (e.g., rows).

As used herein, source data (or also referred to herein as a source table) is a set of data indicating one or more of (i) a new state of data to which the existing data is to be modified, or (ii) a change to be made to corresponding data in the existing data (e.g., the target table). Source data can be a source table, data that is keyed (e.g., such as keyed in accordance with an indexing of a corresponding target table), etc. The source data can be a source table, and each row in the source table can correspond to (e.g., match, be keyed to, etc.) a row in the target table to be merged. In some embodiments, each row in the source table corresponds to a plurality of rows in the target table. For example, source data can comprise source rows that have a key "date", and every target table row that has a matching key "date" is matched and can be updated such as via performing a merge operation.

As used herein, merging data can include contemporaneous updating of existing data and inserting new data. Merging data can further include deletion of existing data. In the example of performing a merge of a source table and a target table in connection with a merge, merging data can include (i) updating one or more rows of the target table based on data in a corresponding row(s) of the source table and (ii) inserting a row in the target table for rows in the source table that have no corresponding rows in the existing target table.

As used herein, matched rows (also referred to herein as matching rows) include a row in the target table for which the source data includes a corresponding entry. For example, a matched row comprises a row in the target table for which a source table has a corresponding row (e.g., a row in the target table corresponding to a particular key/index, and a corresponding row in the source table corresponding to the particular key/index).

As used herein, unmatched rows (also referred to herein as unmatching rows) include a row in the target table or source data for which corresponding entries do not exist across the target table or the source table. An unmatched row of the target table comprises a row in the target table for which a source table does not have a corresponding row (e.g., a row in the target table corresponding to a particular key/index for which the source table does not include a row corresponding to the particular key/index). An example of an unmatched row of the target table includes rows that are not to be modified by the source data. An unmatched row of the source table can include a row in the source table for which a target table does not have a corresponding row (e.g., a row in the source table corresponding to a particular key/index for which the target table does not include a row corresponding to the particular key/index). An example of an unmatched row of the source table includes new data that is to be inserted to the target table.

As used herein, a deletion vector may include an indication of one or more rows that are to be deleted, or have been deleted, from the target table or a target table file. The deletion vector can indicate one or more rows of a resulting table or resulting table file obtained based on a merging of the target table with source data.

In some embodiments, an unmatched row of the target table includes a row that is to be deleted from the target table. For example, a row to be deleted from the target table can be deemed an unmatched row depending on the rules for the corresponding merge command. In the case of SQL syntax, syntax for such an unmatched row in connection with a merge command is a MERGE INTO command as "WHEN NOT MATCHED BY SOURCE AND <extra condition> THEN DELETE". Alternatively, if the syntax for the merge command is "WHEN MATCHED AND <extra condition> THEN DELETE", such rows may be deemed matched rows.

As used herein, compaction includes performance of one or more re-arrangement transactions that reduce the number of files. As an example, compaction of data includes taking a plurality of files and combining those files into a single file. Compaction is believed to improve data clustering and enables more efficient use/modification of the data. An example of compaction of data is described in U.S. patent application Ser. No. 17/580,475, the entirety of which is hereby incorporated by reference for all purposes.

Various embodiments disclose a system, method, and/or device that use unique identifiers associated with records in data to track the same records across target tables and source data. The system can dynamically associate a unique identifier with each record in a dataset (e.g., target table). The system can thereafter use the unique identifier associated with a record to identify matching records (e.g., matching rows, or matching rows of matching records) in the dataset and the source data according to which the dataset is to be updated.

Related art systems that update datasets (e.g., merge tables) generally do not preserve data clustering. Some related art systems are inefficient because such systems generally redistribute unmodified data through the distributed processing system. For example, such related art systems communicate unmodified data across a network and subject the unmodified data to further processing to obtain resulting data (e.g., data that results from the merging of the target data/table and the source data). Other related art systems do not rewrite the target data at all but rather store a record (e.g., a log) of particular parts of the target data that are to be modified in accordance with the source data. For example, the record stores an indication of parts of the target data that are overwritten based on the source data. Such related art systems result in very inefficient read operations. For example, the data clustering of the target data is not maintained, and the system obtains the overwritten data from various locations.

In some embodiments, in response to determining that merging is to be performed with respect to target data (e.g., a target table), the system determines an extent of the target data to be merged, determines whether to reconfigure the target data before performing the merge of the target data, and in response to determining that the target data is to be reconfigured, reconfiguring the data. For example, the system determines the size of file(s) to be processed in connection with performing the merge and determines whether to adjust the size of the file(s), such as based on a data processing policy or other parameters associated with efficient processing of the target data. Adjusting the size of the files can include compacting various subsets of relatively smaller files into various compacted files, or splitting relatively larger files into various smaller files. The data processing policy or other parameters associated with efficient processing of the target data can be configured by a user or input by a user (e.g., via a user interface contemporaneous with providing a request for processing the data, etc.). In some embodiments, the data processing policy or other parameters associated with efficient processing of the target data includes an indication of an ideal/preferred file size or an ideal/preferred range(s) of file sizes. As an example, an ideal/preferred file size or an ideal/preferred range(s) of file sizes can be between 64 MB and 1 GB. As another example, an ideal/preferred file size or an ideal/preferred range(s) of file sizes can be between 128 MB and 1 GB. As another example, an ideal/preferred file size or an ideal/preferred range(s) of file sizes can be between 256 MB and 512 MB. The system adjusts the sizes of files to be processed to enable efficient processing of data in batches. For example, the size of files can be controlled (e.g., reduced) to minimize the cost of rewriting files or the cost of transferring the file(s) across a network, etc.

In some embodiments, in response to determining that merging was performed with respect to target data (e.g., a target table), the system determines an extent of the target data that was merged, determines whether to reconfigure the target data after performing the merge of the target data, and in response to determining that the target data is to be reconfigured, reconfiguring the data. For example, the system determines whether the target data after the merge operation (e.g., the resulting table or resulting files obtained in response to the merge) is stored in a suboptimal way or otherwise deviates from an ideal data configuration, and in response to determining that such data is stored in a suboptimal way or is different from the ideal data configuration, the system reconfigures the data.

Related art systems update data in a target table using a merge operation, such as a "MERGE INTO" SQL statement. The merge operation according to related art systems obtains a target table and merges a set of changes into the target table using a source table that generally includes different data to drive the change(s). The target table and the source table are merged in accordance with a merge condition, which can specify the source table row that applies to a particular target table row. In related art systems, only one source table row can be applied as a change to any one particular target table row. However, multiple target table rows can be applied (e.g., modified based on) using a particular source table row. In response to determining that a target table is to be merged with a source data (e.g., a source table), related art systems obtain (e.g., retrieve) the target table, scan the records/rows of the target table, and perform a merge operation (e.g., a right outer join or inner join) using the target table and the source data. The merge operation can include performing a matching action in accordance with a matching condition being satisfied (e.g., in response to determining that a source table row corresponds to a particular target table row). A matching action can include updating the target table row or deleting the target table row. Updating the target table row can include modifying values for one or more columns of the target table (e.g., modifying the values in accordance with the corresponding source data). For source table rows that do not have a corresponding target table row (e.g., for unmatched rows), the system performs a non-matched action, which can include inserting the source table row into the target table. The related art systems apply the changes based on the source data and write resulting records (e.g., the merged data) to one or more files.

In some embodiments, for target table rows that do not have a corresponding target table row (e.g., for unmatched rows), the system performs a non-matched action, which can include updating the target table row or deleting the target table row (e.g., in accordance with the specified rules).

In connection with performing the merge operation with respect to the various records in the target table and source data, the system obtains the files corresponding to the records from storage. Obtaining the files generally requires the transfer of the entire target table/corresponding files across a network. At scale, target tables include a significant number of records. As a result, transferring the data to merge the target table with the source data can be expensive (e.g., computationally expensive, significant bandwidths, latency, etc.).

In addition to the cost of transferring files across a network, related art systems perform a merge operation with respect to the target table and source table. For example, the related art systems perform a computationally expensive join operation on rows of the target table and the source table. Related art systems may perform the join operation with respect to all rows of the target table and the source table, which at scale is extremely expensive. The join operation can include performing hash matching.

In connection with limiting the cost associated with obtaining and transferring files across a network to perform a merging of a target table with source data, various embodiments selectively transfer parts of the target table (or corresponding information) across a network for merging with the source data. For example, the system selectively determines target table rows or records for which information is to be transferred across the network. The system can determine the target table rows or records for which information is to be transferred across the network based at least in part on a determination of matched rows. As an example, the system can transfer information for matched rows across a network for merging with corresponding source data and performing a merge with respect to unmatched rows without requiring transfer of information for the unmatched rows across the network.

Various embodiments merge a target table and source data based on a determination of matched rows. For example, the system determines matched rows based at least in part on a target table key (e.g., an index for target table records). In response to determining/obtaining source data, the system can determine whether the source data is keyed (e.g., indexed in a similar manner to the target table with which the source data is to be merged). If the source data is keyed, then the system uses the source data keys and target table keys to determine matched rows and unmatched rows. Conversely, according to various embodiments, in response to determining that the source data is not keyed (e.g., the data can be a complex query, which may be a combination of tables), the system uses the source data to instantiate a source table that is keyed/indexed in accordance with the keying/indexing of the target table. The target table can be keyed based on including a column in the target table that includes a key for the various records (e.g., key identifiers). The system can then use the source table in connection with merging the target table with the source data.

According to various embodiments, the system performs a first job based at least in part on the target table and the source data to be merged. The first job is performed in connection with determining matched rows and/or unmatched rows. In some embodiments, performing the first job includes (i) reading the target table and the source data, (ii) joining the target table and the source data (e.g., a source table) in connection with determining files in the target table (e.g., in the case of a file-based table) that have at least one matching record with a record in the source data. As an example, the system can store an indication of whether a record in the target table or source data is a matched row (or matched record). As another example, the system stores an indication of only those rows or records that are matched rows/matched records. In some embodiments, the system determines which target table files had a record that matched a record in the source data. For example, for each target table row, the system remembers (e.g., stores an indication of) the file from which the row was obtained, and after the join operation performed with respect to the source data, the system remembers which target table files are invoked in the output of the join operation.

In some embodiments, the system determines, based at least in part on results of the first job, the rows/records that are to be transferred across a network for merging the target table and the source data. For example, the system queries a mapping of files/records corresponding to matched rows and performs a merging of the matched rows of target table and source data. The merging of the matched rows of the target table and the source data can include performing a join operation with respect to the matched rows of the target table and a source table.

According to various embodiments, the system performs a second job (also referred to herein as the primary second job) based at least in part on certain rows of the target table and certain records of the source data to be merged. The second job can be performed based at least in part on the results of performing the first job. For example, the system uses the indications of matched rows in connection with determining rows of the target table and records of the source data for which the second job is to be performed. The system can obtain the indication of matched rows and indication of which file from which the matched row of the target table originate to determine the files to be subject to the second job. Performing the second job can include transferring files corresponding to the matched rows across the network (e.g., the compute resource(s) performing the second job obtains the files for which a join operation is to be performed).

In some embodiments, performing the second job includes scanning the matched target table rows and the corresponding records of the source data (e.g., matched rows of the source table) and performing a join operation with respect to such matched rows. The join operation can be a right outer join or an inner join. The scanning of the matched target table rows can include reading all the rows for the matching target table files (e.g., the files corresponding to the matched rows of the target table). In some embodiments, performing the second job includes only performing the join operation on the matched rows. In some embodiments, the second job is only performed with respect to matching rows of matching files (e.g., matched rows of the files corresponding to matched rows of the target table). For example, unmatched rows are not scanned and joined in connection with the second job. In response to performing the join operation, the system applies the applicable changes. For example, the system merges the data in the matched target table rows in accordance with the source data. In response to merging the data in the matched rows, the system stores the resulting data (e.g., the data changed in accordance with the source data) in corresponding resulting files (e.g., second job resulting files). As an example, if files A, B, and C correspond to matched table rows, the system stores files E, D, and F respectively corresponding to files, A, B, and C modified in accordance with the source data. In some embodiments, performing the second job includes storing, for each file corresponding to a matched row, a corresponding resulting file. In some embodiments, performing the second job includes redistributing the data from the matched rows among a set of second job resulting files. For example, for rows comprised in a single target table file, performing the second job can include storing second data for the single target table file across a plurality of second job resulting files.

Performing the second job can include filtering out one or more of (i) unmatched source data records (e.g., unmatched rows of the source table) from the source data, and (ii) unmatched rows of matched target table rows (e.g., rows in the files of the matched target table rows for which the source data has no corresponding record). In some embodiments, the system scans the source table to obtain only matched source data records (e.g., rows in the source table having a corresponding row in the target table), which can thus eliminate the need to filter out the unmatched source data records after the join operation (e.g., the join operation is only performed with respect to the matched source data records). In this case, as part of the first job, the system also stores an indication of matched source data records so the system can later determine the matched source data records when performing the second job and avoiding performing the join operation of the second job on the unmatched source data records.

If a target table is to be merged with source data, three types of records can exist: (i) matched rows across the target table and source data; (ii) target table rows/records for which the source data has no corresponding row/record, and (iii) source data rows/records for which the target table has no corresponding row/record. If the second job is only performed with respect to the matched rows, then other records can remain (e.g., records under (ii) and (iii)) for which merging is to be performed.

According to various embodiments, the system performs a third job based at least in part on certain rows of the target table and certain records of the source data to be merged. In some embodiments, the system performs the third job with respect to one or more records/rows that were not subject to the second job. For example, the third job is performed with respect to unmatched rows. As another example, the third job is performed with respect to unmatched rows of matched target table files (e.g., target table files having at least one matching row). In some embodiments, the third job is performed with respect to unmatched target table rows (e.g., only unmatched target table rows). The system determines the unmatched target table rows based on the results of the first job. For example, the system can use an indication of whether a target table row is a matched row if the indication is stored based on results of the first job. As another example, the system determines the remaining records (e.g., the unmatched target table rows) based on the indication of matched target table rows if the indication is stored based on the results of the first job. In other words, the system can determine the unmatched target table rows based on subtracting the matched target table rows from the set of all target table rows.

In some embodiments, unmatched target table files (e.g., target table files that do not have a row that matches a source data) is not subject to a third job. The information in such unmatched target table files can be reorganized in a post-processing step, such as a compaction operation.

In some embodiments, performing the third job includes scanning the target table for unmatched rows in matching files. For example, the system uses the results from the first job to determine target table rows having corresponding source data records (e.g., matched target table rows), the system then determines those rows of the files for the matched target table rows that are unmodified, and the system then performs the third job with respect to such rows of the files for the matched target table rows that are unmodified (e.g., for which the source data does not include any corresponding record). In response to scanning (e.g., obtaining) the unmatched rows in the matching files, the system stores the unmatched rows to one or more third job resulting files. In some embodiments, for each file (e.g., a matching file) of the matched target table rows comprising unmatched rows (e.g., unmodified parts of a file corresponding to a matched target table row), the system stores a third job resulting file. For example, the system stores a third job resulting file for each file scanned in connection with performing the third job. As another example, the system can store a plurality of third job resulting file for each file scanned in connection with performing the third job. As another example, the system can store a single third job resulting file for a plurality of files scanned in connection with performing the third job.

Using the previous example, if files A, B, and C correspond to matched table rows, the system stores the third job resulting files as A', B', and C'. Accordingly, after performing the second job and the third job, the resulting files include the second job resulting files (e.g., E, D, and F) and the third job resulting files (e.g., A', B', and C').

In some embodiments, the system can skip performing the third job with respect to a matching file (e.g., a file corresponding to matched target table rows) if all rows in the matching file are matched rows. The system can determine the matching files for which all rows have corresponding records in the source data, and the system can perform the second job with respect to such matching files without performing the third job with respect to such matching files.

According to various embodiments, the system may perform a fourth job based at least in part on certain rows of the source data. The system performs the fourth job with respect to unmatched source data records. For example, the system determines source table rows that do not have a corresponding/matching target table row and performs the fourth job. Performing the fourth job can include scanning the source data to obtain the unmatched source data records and re-writing such unmatched source data records into one or more new files (e.g., one or more fourth job resulting files). In some embodiments, the system writes out all the unmatched source data records into a single fourth job resulting file or multiple fourth job resulting files. The unmatched source data records can correspond to records that are to be inserted into the target table in connection with performing the merging of the target table and source data.

Performing the first, second, third, and fourth jobs with respect to target files (e.g., files A, B, and C) can result in an increase in the number of files for the modified data. For example, performing first, second, third, and fourth jobs on the target table corresponding to files A, B, and C can result in files D, E, F, A', B', C', and the fourth job resulting file (e.g., file G). If the number of files increases too much, the foregoing can lead to difficulties in scaling the merging. Various embodiments implement counter measures to reduce the number of resulting files or to limit the number of resulting files being created. The counter-measures can include performing a post-processing with respect to a plurality of the resulting files or performing a secondary second job and modified third job, which are configured to reduce the number of resulting files being created across the second job and the third job.

According to various embodiments, the system performs a post-processing of the resulting files (e.g., the files resulting from the second job, the third job, and the fourth job). The post-processing of the resulting files can include performing a compaction with respect to two or more of the resulting files. For example, the system can create a single file comprising the information of a plurality of files. Using the illustrative example above, if the resulting files include A', B', C', D, E, F, and G, the system may perform a compaction of files B' and C' to obtain file H, and a compaction of files E, F, and G to obtain file I. Accordingly, the resulting files is reduced to A', H, and I. In some embodiments, the system performs the compaction with respect to the plurality of resulting files based at least in part on one or more predefined compaction thresholds. The one or more compaction thresholds can include a large file threshold and/or a small file threshold. As an example, the system can determine to compact a set of files having a file size less than the predefined compaction threshold(s) (e.g., the small file threshold). As another example, the system can exclude files having a file size higher than a predefined compaction threshold(s) (e.g., the large file threshold).

In some embodiments, the system uses one or more post-processing heuristics in connection with determining whether to perform a post-processing of the resulting files (e.g., performing a compaction with respect to one or more resulting files, etc.). Examples of the one or more post-processing heuristics include (i) clustering property preservation (e.g., combining only files that include similar data, combining files that are adjacent in a total or partial ordering of files), (ii) bin packing files according to a predefined bin packing scheme (e.g., to achieve files that are as close as possible to a predetermined size), (iii) determining not to combine files if a number of resulting files is less than a predetermined resulting file threshold (e.g., to avoid performing unnecessary work), (iv) combining files based on when the files were created (e.g., based on the files having a similar age, or an age within a threshold age difference, etc.), (v) combining files based on a determination that the files to be combined are comprised in a same partition of the resulting table (e.g., if the resulting table is partitioned into multiple partitions), (vi) determining not to combine a first file with a second file if the first file has a size larger than a predefined file size threshold, (vii) determining not to combine a first file and a second file if the resulting file is expected to have a size larger than a predefined file size threshold, (viii) determining to combine a plurality of files to obtain a number of combined files less than a predefined file number threshold (or such that the expected number of resulting files after the combining would be less than the predefined file number threshold), (ix) determining whether to combine a plurality of files based on an expected amount of time to be used to combine the files (e.g., such that the expected amount of time is less than a predefined time threshold), etc. Various other post-processing heuristics may be implemented.

According to various embodiments, the system performs a secondary second job based at least in part on certain rows of the target table and certain records of the source data to be merged. The second job discussed above (e.g., the primary second job) performs the second job only with respect to matched target table rows (e.g., matching rows of matching files). In other words, the second job described above limits the amount of information transferred across the network and subject to the join operation by only obtaining and computing a join operation with respect to matching rows of matching files (e.g., matched rows of the files corresponding to matched rows of the target table). The secondary second job can include scanning (e.g., obtaining) unmatched rows in matching target table files and performing a union operation with respect to the output from the performing the primary second job (e.g., the changes being applied with respect to the matching rows of matching target table files). The result of the union operation are then written to second job resulting files.

In some embodiments, only a subset of the unmatched rows in matching files are input to the secondary second job. For example, the system can determine/select the unmatched rows in matching files to be input to the secondary second job based on a policy or one or more rules or heuristics. The unmatched rows in the matching files that are input to the secondary second job can be determined based on a file size of a file storing the unmatched rows. For example, the system may select files, from among the matching files, having a file size less than a file size threshold and perform the secondary second job with respect to all rows in the selected files. Using the illustrative example above, if the system performs the primary second job, the resulting files include D, E, F, as second job resulting files (where D, E, and F may respectively correspond to the matched rows of matching files A, B, and C) and A', B', C' as third job resulting files. If the secondary second job is implemented and file B is selected for all rows to be input to the secondary second job, then the files resulting from the second job resulting files include A', J, C', where J may correspond to the union of B' and E. Although performing the secondary second job with respect to all rows in a subset of matching files will require transmission across the network of data for unmatched rows in the matching files, the secondary second job (as compared to the related art systems) save on the cost associated with performing a join operation on all rows in the files (e.g., the join operation of the secondary second job is only performed with respect to matched rows of the matching files). In some embodiments, the system selects a threshold number of files for which the secondary second job is performed with respect to all rows in the selected files (e.g., which may avoid instances where all files are less than a file size threshold used to select files which would then result in all files being subject to the secondary second job.

Examples of the one or more mixing heuristics include (i) determining to mix a threshold number of files, (ii) determining to mix in files that combine up to a predefined maximum size threshold (e.g., the aggregated size of the files to be mixed in is less than the maximum size threshold), (iii) determining to mix in files that combine to be less than a predefined minimum size threshold, (iv) selecting a set of smallest files first (e.g., the files to be mixed in are selected based on an order of file size from smallest to largest up to a threshold number of files or otherwise based on another mixing heuristic), (v) having a preference to mix in a set of smallest files that combine up to a predefined maximum size threshold, (vi) selecting a set of files to mix in such that the files to be mixed in combine to exceed a predefined minimum size threshold by as little as possible, (vii) selecting files to be mixed in based on a determination that a mixed-in unmodified data and the modified data are expected to match (e.g., be within a threshold size), etc. Various other mixing heuristics may be implemented. In some embodiments, the system determines the subset of the unmatched rows in matching files to be input to the secondary second job on a per-partition basis or for each partition separate from the determination made for other partitions).

According to various embodiments, if the secondary second job is implemented, a modified third job is similarly implemented. The modified third job only performs the processing with respect to unmatched rows that are not to be processed by the secondary second job.

In some embodiments, the system determines whether a file of the target table is greater than a predefined file size threshold. For example, some files can be extremely large such as on the order of 1 GB. If the file(s) to be written via the second job and third job are significantly large and a small number of files are to be written, then the utilization of the compute resources allocated to performing the merge of the target table with the source data is suboptimal. Further, allocating additional compute resources will not improve processing the single file because each file is processed by a single compute resource. The system can use the predefined file size threshold to determine whether to segment the file into a set of smaller files, which can then be processed in parallel by the compute resources. The segmentation of the file(s) into smaller files and parallel processing of the files can improve the perceived latency for performing the merge. For example, if a single large file of file size 1 GB would be written, the segmentation of the file into five smaller files and parallel processing of the smaller files (e.g., among 5 concurrent processes) can lead to an improvement in cost/efficiency of five times the cost/efficiency of processing the single large file. The segmentation of a larger file and parallel processing the smaller files can be implemented for those file formats that support segmentation (e.g., files having the Apache Parquet file format).

In some embodiments, the system performs a change tracking of data. For example, the system maintains a log indicating changes made to the target table data. Examples of the change tracking include (i) the system can log the rows that are deleted, (ii) the system can log the rows that are deleted and the values in such rows, (iii) the system can log rows that are updated, and (iv) the system can log rows that are updated and values in the row before the updated and/or values in the row after the update.

The results of the first job can be stored in a bitmap or bit vector that identify matched rows. For example, the bitmap or bit vector can store an indication of those rows that are matched rows. Accordingly, the second job (or secondary second job) reads all rows that are in the bitmap, and the third job reads all rows that are not in the bitmap or bit vector.

Various embodiments merge a target table and source data based at least in part on a set of deletion vectors. In some embodiments, the deletion vectors are associated with one or more previously removed rows of the target table files (e.g., the matching target table files). A deletion vector may also be associated with a row to be removed from a target table file. Information pertaining to the deletion vector(s) is stored in association with the target table or resulting table after the merge. For example, the information pertaining to the deletion vector is stored as metadata comprised in (or associated with) the target table or resulting table, as applicable. As another example, the system maintains a log of deletion vectors for all rows that are deleted from the target table. In some embodiments, the information pertaining to the deletion vector is stored in association with a target table file to which the deletion vector applies (e.g., a deletion vector is mapped to a particular target table file in the target table). Because the rows for target table files corresponding to deletion vectors correspond to information that is deleted from the applicable target table file(s) (e.g., the matching target table file), communicating such information across a network in connection with performing a merge of the target table with source data would be wasteful. Accordingly, the system obtains an indication of the deletion vectors associated with a target table and restricts rows corresponding to the deletion vectors from being communicated in connection with performing the second job. For example, the system can use the deletion vectors as an indication of the rows in the target table files to ignore when performing the merge between the target table and the source data.

According to various embodiments, if a target table has associated deletion vectors, the system performs a different version of the second job wherein the performing the second job includes, for each of the set of matching target table files, performing a matching action based at least in part on (i) a set of the particular set of rows comprised in the matching target table files, (ii) matching rows in the one or more matching source table records, and (iii) one or more deletion of vectors associated with previously removed rows of the matching target table files and obtaining one or more second job resulting files based on the matching action. In some embodiments, performing the second job includes reading rows of a particular matching target table file, and reading rows of the particular matching target table file includes skipping rows of the particular matching target table file corresponding to one or more existing deletion vectors associated with the particular matching target table file.

In some embodiments, the system determines the deletion vectors while performing the first job so that the system knows which rows to not pass to the second job. For example, a modified first job is performed, wherein the first job includes (x) determining a set of matching target table files comprising the one or more target table files for which the source table has one or more matching source table records, (y) performing the first job further comprises determining a set of deletion vectors corresponding to the one or more target table files, and (z) storing target table information indicating the set of matching target table files, and for each of the set of matching target table files, a particular set of rows having matching rows in the one or more matching source table files. In addition to determining the deletion vectors for previously deleted rows in the target table files, the system (e.g., in connection with performing the first job) can determine a set of deletion vectors, if any, for rows that are to be deleted from the target table. The rows that are to be deleted from the target table can be determined based on the source data or another input for updating the target table. The system can store an indication of the set of deletion vectors stored in target table information, and the second job obtains the indication of the set of deletion vectors from the target table information in connection with performing the matching action.

In connection with performing the first job including reading in the target table to determine matching target table files and matching source table records or matching rows in the target table files/source table records, the system can obtain information pertaining to the deletion vectors associated with the target table (e.g., the target table files) and use such information to restrict the reading in of those portions of the target table (e.g., portions of the corresponding target table files) that are not subject to a deletion vector.

In some embodiments, the system persists the deletion vectors associated with a target table and/or a resulting table obtained based on the merging of the target table and source data. The system can persist the deletion vectors in one or more deletion vector files. The deletion vectors can be stored across one or more deletion vector files in accordance with a predefined deletion vector policy. As an example, the predefined deletion vector policy can indicate one or more of (i) a maximum size threshold for the one or more deletion vector files, (ii) a minimum size threshold for the one or more deletion vector files, and/or (iii) a particular target table file is to be stored in a particular deletion vector file. As another example, the predefined deletion vector policy can be implemented on a compute-resource basis such that each compute resource stores deletion vectors for parts of the target table being processed by the compute resource in a different set of one or more deletion vector files. The persisting of the deletion vectors can be implemented based on performing a fifth job. The fifth job can include storing in the one or more deletion vector files an indication of deletion vectors associated with one or more target table files. In some embodiments, the persisting of the deletion vectors can be done as part of the first job.

During the merging of the target table with the source data, metadata associated with the target table and resulting table, as applicable, may become invalid or outdated. For example, the system stores metadata indicating a set of statistics for the target table, the resulting table, or corresponding files. Examples of the statistics may include a minimum value, a maximum value, and a null value (e.g., a number of nulls for a particular column). As the system generates resulting files from the various jobs (e.g., second job resulting files, third job resulting files, fourth job resulting files, etc.), the range of values in the files may change, etc. According to various embodiments, in response to obtaining the resulting table, the system performs a post-processing operation to update metadata statistics for files of the resulting table. The system can determine the min/max for each file of the resulting table and update the metadata associated with such files/resulting table, accordingly. As an example, if the target table has file A and a deletion vector that is associated with one or more rows in file A, the system determines whether the deletion vector associated with file A changes the min/max value(s) for file A. In response to determining that the deletion vector associated with file A changes the min/max value(s) for file A, the system updates the metadata associated with file A to reflect the state of file A as modified by the deletion vector.

Various embodiments included herein disclose a system, method, and/or device for merging data. The method includes determining to merge a target table and a source table, wherein the source table has one or more files that are different from one or more files in the target table, and in response to determining to merge the target table and the source table, performing a first job, a second job, and a third job, and obtaining a resulting table. Performing the first job includes determining a set of matching target table files comprising the one or more target table files for which the source table has one or more matching source table files and storing target table information indicating (i) the set of matching target table files and (ii), for each of the set of matching target table files, a particular set of rows having matching rows in the one or more matching source table records. Performing the second job includes for each of the set of matching target table files, performing a matching action based at least in part on (i) a set of the particular set of rows comprised in the matching target table files and (ii) matching rows in the one or more matching source table records and obtaining one or more second job resulting files based on the matching action. Performing the third job includes determining unmatched rows for files of the target table that do not have corresponding matching rows in files of the source table and storing the unmatched rows for the target table files that do not have corresponding matching rows in the source table records in one or more third job resulting files. The resulting table is obtained based at least in part on the one or more second job resulting files and the one or more third job resulting files.

Various embodiments included herein disclose a system, method, and/or device for merging data. The method includes determining to merge a target table and a source table, wherein the source table has one or more records that are different from the target table, in response to determining to merge the target table and the source table, performing a first job and a second job, obtaining one or more other resulting files, obtaining a set of processed files based at least in part on performing a post-processing operation with respect to a set of resulting files, and obtaining a resulting table based at least in part on the set of processed files. Performing the first job includes determining a set of matching target table files comprising the one or more target table files for which the source table has one or more matching source table records and storing target table information indicating (i) the set of matching target table files and (ii), for each of the set of matching target table files, a particular set of rows having matching rows in the one or more matching source table records. Performing the second job includes for each of the set of matching target table files, performing a matching action based at least in part on (i) a set of the particular set of rows comprised in the matching target table files and (ii) matching rows in the one or more matching source table records, and obtaining one or more second job resulting files based on the matching action. The one or more resulting files are obtained based at least in part on unmatched rows among the target table and the source table. The set of resulting files comprises (x) the one or more second job resulting files and (y) the one or more other resulting files, wherein the post-processing operation reduces a number of corresponding files in the set of processed files such that the set of processed files has less files than the set of resulting files.

Various embodiments included herein disclose a system, method, and/or device for merging data. The method includes determining to merge a target table and a source table, in response to determining to merge the target table and the source table, performing a first job and a second job, obtaining one or more other resulting files, and obtaining a resulting table. Performing the first job includes determining a set of matching target table files comprising one or more target table files for which the source table has one or more matching source table records, and storing target table information indicating (i) the set of matching target table files, and (ii), for each of the set of matching target table files, a particular set of rows having matching rows in the one or more matching source table files. Performing the second job includes for each of the set of matching target table files, performing a matching action based at least in part on (i) a set of the particular set of rows comprised in the matching target table files and (ii) matching rows in the one or more matching source table records, selecting a first set of unmatched rows from the matching target table files to process in the second job, the first set of unmatched rows being selected based at least in part on a mixing policy, performing a second matching action based at least in part on the first set of unmatched rows, and obtaining one or more second job resulting files based on the first matching action and the second matching action. The one or more other resulting files are obtained based at least in part on a second set of unmatched rows among the target table and the source table that results from the first set of unmatched rows having been processed in the second job. The resulting table is obtained based at least in part on (x) the one or more second job resulting files and (y) the one or more other resulting files.

Various embodiments included herein disclose a system, method, and/or device for merging data. The method includes determining to merge a target table and a source table, wherein the source table has one or more files that are different from one or more files in the target table, in response to determining to merge the target table and the source table performing a first job and a second job, persisting one or more deletion vectors for corresponding rows of the one or more target table files and obtaining a resulting table. Performing the first job includes determining a set of matching target table records comprising one or more records of the target table for which the source table has one or more matching source table records and storing target table information indicating (i) the set of matching target table records and (ii), for each of the set of matching target table records, a particular set of rows having matching rows in the one or more matching source table records. Performing the second job includes for each of the set of matching target table files, performing a matching action based at least in part on (i) a set of the particular set of rows comprised in the matching target table files, (ii) matching rows in the one or more matching source table records, and (iii) one or more deletion of vectors associated with previously removed rows of the matching target table files and obtaining one or more second job resulting files based on the matching action. The one or more deletion vectors are persisted in one or more deletion vector files. The resulting table is obtained based at least in part on the one or more second job resulting files and the one or more deletion vector files.

Various embodiments improve the latency and cost for performing the merge and can preserve data locality. For example, various embodiments preserve an ordering of data in files, provide good data clustering, and store data in efficient file sizes. The foregoing can further improve read performance because of data locality and size of files.

Various embodiments improve the efficiency of merging data and performing read operations on resulting data (e.g., data resulting from the modifications to target data in accordance with the source data).

FIG. 1 is a block diagram of a system for merging data according to various embodiments of the present application. In some embodiments, system 100 (e.g., data merging service 110) implements process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, and/or process 1800 of FIG. 18.

In the example illustrated in FIG. 1, system 100 includes data merging service 110, data store 120, administrator system 130, client system 140, and/or data source 150. In some embodiments, data merging service 110 and/or data source 150 are integrated (e.g., combined into a layer or a single set of servers). System 100 further includes one or more networks such as network 160 over which administrator system 130 and/or client system 140 communicates with data merging service 110, data store 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, data merging service 110 comprises data layer 112, control layer 114, and business application layer 116. Data layer 112, control layer 114, and/or business application layer 116 can be respectively implemented by one or more servers. In some embodiments, data layer 112, control layer 114, and/or business application layer 116 are implemented using a same set of one or more servers. In some embodiments, system 100 comprises a plurality of data layers that respectively process data pertaining to various tenants or customers. For example, each data layer can be implemented for a different tenant or customer.

According to various embodiments, data merging service 110 performs a merge between a target table and source data such as a source table or other keyed source data. Data merging service 110 can receive requests to update data for one or more datasets from client system 140 and/or data source 150. For example, data merging service 110 can receive a request to merge a target table comprised in the or more datasets with source data. The source data may be stored in data store 120 among the one or more datasets or may be received via data source 150 such as in the form of a data stream. Client system 140 and/or data source 150 can be connected to data merging service 110 via a connector, such as an application programming interface (API). In some embodiments, data merging service 110 provides data (or access to data such as via a link) in response to data requests. For example, the data requests can be communicated to data merging service 110 by client system 140. In some embodiments, data merging service 110 receives a data request from a data requesting service such as a third-party service. Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other data consuming clients. In some embodiments, data merging service 110 comprises (e.g., implements) such data requesting services.

In response to receiving a request to perform a merge of a target table with source data, data merging service 110 analyzes the source data to determine whether the source data is keyed in a manner that corresponds to the target table (e.g., determines whether the source data is a source table comprising a same or compatible type of indexing as the target table). In response to determining that the source data is keyed in the manner that corresponds to the target table, data merging service 110 can merge the target table with the source data. Conversely, in response to determining that the source data is not keyed in the manner that corresponds to the target table, data merging service performs a pre-processing with respect to the source data to instantiate such data into a source table (e.g., a temporary source table is instantiated to allow for the merge operation to be performed). Further in response to receiving the request to perform the merge of the target table with the source data, data merging service 110 determines whether to reconfigure the target table, such as determining whether to adjust the sizes of the files to be processed. Data merging service 110 can implement a data processing policy or other parameters associated with efficient processing to determine whether to reconfigure the file(s) to be processed and/or in response to determining that the file(s) are to be reconfigured, to reconfigure the file(s) accordingly.

According to various embodiments, data merging service 110 (e.g., control layer 114) obtains an indication that a merge or update is to be performed, such as from client system 140 or another data requesting (or consumption) service. In response to obtaining the indication that the merge or update is to be performed, data merging service 110 (e.g., data layer 112) can obtain the corresponding file(s) and invoke one or more jobs in connection with performing the merge.

In response to determining that a target table and source data is to be merged (e.g., based on a request received by control layer 114), data merging service 110 uses data layer 112 to perform the merge. Data layer 112 performs the merge based on performing one or more jobs and obtains a resulting table corresponding to the merge between the target table and the source data. In some embodiments, data layer 112 comprises cluster 115 of compute resources (e.g., virtual machines, etc.) that perform the one or more jobs with respect to files for the target table and source data. The one or more jobs performed by data layer 112 can include one or more of a first job, a second job, a third job, a fourth job, and a fifth job. In some embodiments, a plurality of the jobs is performed in parallel, such as by different compute resources in cluster 115.

In some embodiments, data layer 112 uses the first job to determine matching target table files and/or matching rows of the matching target table file and to store an indication of the matching target table files and/or matching rows for use in performing various other jobs to complete the merge. The first job may further include determining matching source data records (e.g., matching files in the source table and/or or matching rows in the source table files) for use in optimizing file transfer over the network in connection with performing another job, such as the second job. The first job may further include determining one or more deletion vectors associated with the target table and/or determining the applicable target table files or rows of the target tables files associated with the deletion vector(s).

In some embodiments, data layer 112 uses the second job to perform a matching action with respect to (i) matching rows of the matching target table files and (ii) the source data. Data layer 112 can obtain an indication of the matching rows of the matching target table files based on results from the first job. The performing the second job may be optimized to reduce an amount of source data that is transferred across the network for data layer 112 to implement the second job. For example, data layer 112 can obtain an indication of matched source data records (e.g., matching files in the source table and/or matching rows in the source table files), such as based on results from the first job. In response to determining the matching rows of the matching target table files and the corresponding source data, data layer 112 performs a matching action. For example, data layer 112 performs a right outer join or an inner join with respect to the matching rows of the matching target table files and the corresponding source data and then applies the changes made by merging the matching rows of the target table files with the source data. Data layer 112 stores results from the second job in one or more second job resulting files.

In some embodiments, data layer 112 implements another version of the second job (also referred to herein as the secondary second job) in which certain unmatched rows in matching target table files are processed in the second job. In response to determining the matching rows of the matching target table files and the corresponding source data, data layer 112 performs a matching action. For example, data layer 112 performs a right outer join or an inner join with respect to the matching rows of the matching target table files and the corresponding source data, and then applies the changes made by merging the matching rows of the target table files with the source data. Data layer 112 also obtains a subset of the unmatched rows of the matching target table files and performs a union with respect to the applied changes obtained by merging the matching rows of the target table files with the source data. Data layer 112 stores results from the secondary second job in one or more second job resulting files. In some embodiments, data layer 112 selects the subset of the unmatched rows of the matching target table files based at least in part on a predefined mixing policy.

In some embodiments, data layer 112 uses the third job to store target table information corresponding to unmatched rows in matching target table files. Data layer 112 determines the unmatched rows in the matching target table files based on the results of the first job (e.g., based on the indication of the matched rows of matching target table files). Data layer 112 writes the unmatched rows of the matching target table files in corresponding third job resulting files. If data layer 112 performs the secondary second job to mix in certain unmatched rows of matching target table files to the second job, then the third job obtains a remainder of the unmatched rows of the matching target table files. For example, the third job is performed with respect to any unmatched rows of the matching target table files that are not processed in the second job (e.g., the secondary second job).

In some embodiments, data layer 112 performs a fourth job. The fourth job includes determining unmatching rows of the source data, reading the unmatched rows of the source data, and writing the unmatched rows of the source data to a fourth job resulting file.

In some embodiments, data layer 112 persists deletion vectors for rows deleted from the target table (e.g., rows from various target table files). In connection with persisting the deletion vectors, data layer 112 performs a fifth job. The fifth job can include determining one or more deletion vectors for rows that have been deleted and one or more deletion vectors for rows that are newly deleted (e.g., to be deleted during the merge or update). In some embodiments, data layer 112 performs the first job instead of the fifth job in connection with persisting the deletion vectors; and the first job can include determining one or more deletion vectors for rows that have been deleted and one or more deletion vectors for rows that are newly deleted (e.g., to be deleted during the merge or update). In response to determining the existing deletion vectors and the new deletion vectors, data layer 112 stores the deletion vectors in one or more deletion vector files. Data layer 112 can store the deletion vectors across the one or more deletion vector files based on a predefined deletion vector policy.

In some embodiments, in response to performing the jobs in connection with the merge of the target table with the source data, data layer 112 obtains a resulting table (e.g., corresponding to an output of the merge). Data layer 112 can obtain the resulting table based at least in part on the resulting files from the jobs performed in association with the merge (e.g., second job resulting files, third job resulting files, fourth job resulting files, and/or deletion vector file(s)). The resulting table can be used as a target table in a subsequent merge operation (e.g., with new/different source data).

In some embodiments, data layer 112 performs one or more post-processing operations with respect to the resulting table or the corresponding resulting files. Examples of post-processing can include (i) performing a compaction of a plurality of the resulting files to reduce the number of resulting files, and/or (ii) updating the statistics (e.g., min/max values, null values, etc.) of the various resulting files to ensure that the statistics are accurate after performing the merge (and considering the applicable deletion vector(s)). The post-processing can be performed based on one or more policies such as a compaction policy, a statistics update policy, etc.

In response to determining to perform a merge (e.g., to perform one or more jobs), data layer 112 can allocate one or more compute resources to process the merge (e.g., to perform the one or more jobs). For example, data layer 112 allocates a worker in cluster 115 to process the merge.

In some embodiments, data merging service 110 uses control layer 114 to respond to queries for data with respect to a particular data entity or in connection with controlling the processing of various updates or merge requests. As an example, client system 140 uses an API to connect to an information ingesting service and to configure one or more settings for processing a merge with respect to a target table and source data. Control layer 114: a) receives the configurations, queries, etc. from the API; b) queries data store 120 for data responsive to the query or request to perform a merge; and c) provides the data to the system or service requesting the data.

According to various embodiments, system 100 comprises data store 120. System 100 uses data store 120 to store one or more datasets comprising data entities and data for the data entities. Data store 120 can store datasets for a plurality of tenants or customers serviced by data merging service 110. Data store 120 can store a target table and/or source data to be used in a merge.

According to various embodiments, system 100 comprises administrator system 130 for use by an administrator such as an administrator of data merging service 110 or an administrator of a user associated with data store 120 and/or an instance of data merging service 110. For example, administrator system 130 comprises a system for communication, data access, computation, etc. An administrator uses administrator system 130 to maintain a dataset stored in data store 120, to define and manage applications provided by system 100, to set data management policies, to set data merging policies, to set compaction policies, to set deletion vector policies, to provide various system configurations or settings, etc. For example, an administrator uses administrator system 130 to define one or more security policies that are to be enforced (e.g., by data merging service 110, data layer 112, and/or control layer 114) with respect to a data stored by data store 120. In some embodiments, administrator system 130 communicates with data merging service 110 via a web-interface (e.g., by using a web browser, etc.). For example, administrator system 130 communicates with data merging service 110 via a web-browser installed on administrator system 130 (e.g., via a user interface configured by an application running on data merging service 110). In some embodiments, administrator system 130 communicates with data merging service 110 via an application or service running on administrator system 130 (e.g., a connector or API corresponding to data merging service 110).

According to various embodiments, data merging service 110 comprises business application layer 116. Data merging service 110 uses business application layer 116 to provide an interface via which a user (e.g., using administrator system 130, client system 140, etc.) may interact with various applications such as a development application for developing a feature or model for analyzing the data stored in the data store 120, an application for querying a dataset stored in data store 120, an application for analyzing/manipulating a data entity (e.g., a table, the dataset, etc.), an application to access files stored in a dataset (e.g., a dataset stored in data store 120), an application to perform dataset cleanup such as compaction operations, an application to review a resulting table obtained from a merge operation, etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and sends the formatted query to data layer 112). As another example, an administrator uses an interface provided/configured by business application layer 116 to configure (e.g., define) one or more security policies including configuring access permissions to files, data entities, and/or one or more data management policies.

According to various embodiments, system 100 comprises client system 140. Client system 140 is used by a user such as a user corresponding to a data recipient (e.g., a developer such as a developer of code, a developer of a model, a user consuming the information ingested by data merging service 110 processing a file, a user of an organization associated with a one or more datasets stored at data store 120, etc.) to communicate with data merging service 110 (e.g., business application layer 116) and/or data stored in data store 120. As an example, client system 140 communicates with data merging service 110 via a web-interface. In some embodiments, client system 140 communicates with data merging service 110 via an application or service running on client system 140 (e.g., a module such as a connector or API that interfaces with data merging service 110). In some embodiments, a user uses client system 140 to develop code on business application layer 116, which makes a call to with respect to data exposed via data merging service 110, or to invoke a task to be performed with respect to certain data stored in data store 120 (e.g., to update a target table, to merge a target table with source data, etc.), to modify code at a business application (e.g., to execute code against data stored in data store 120), to query data store 120 or a data share corresponding to a subset of data (e.g., data objects) within data store 120 (e.g., in connection with discovering code, a library, a module, etc.), etc.

According to various embodiments, system 100 comprises data source 150. Data source 150 can provide data to be processed by data merging service 110 and stored in datasets on data store 120. For example, data merging service 110 can ingest data provided by data source 150.

Figure 2:
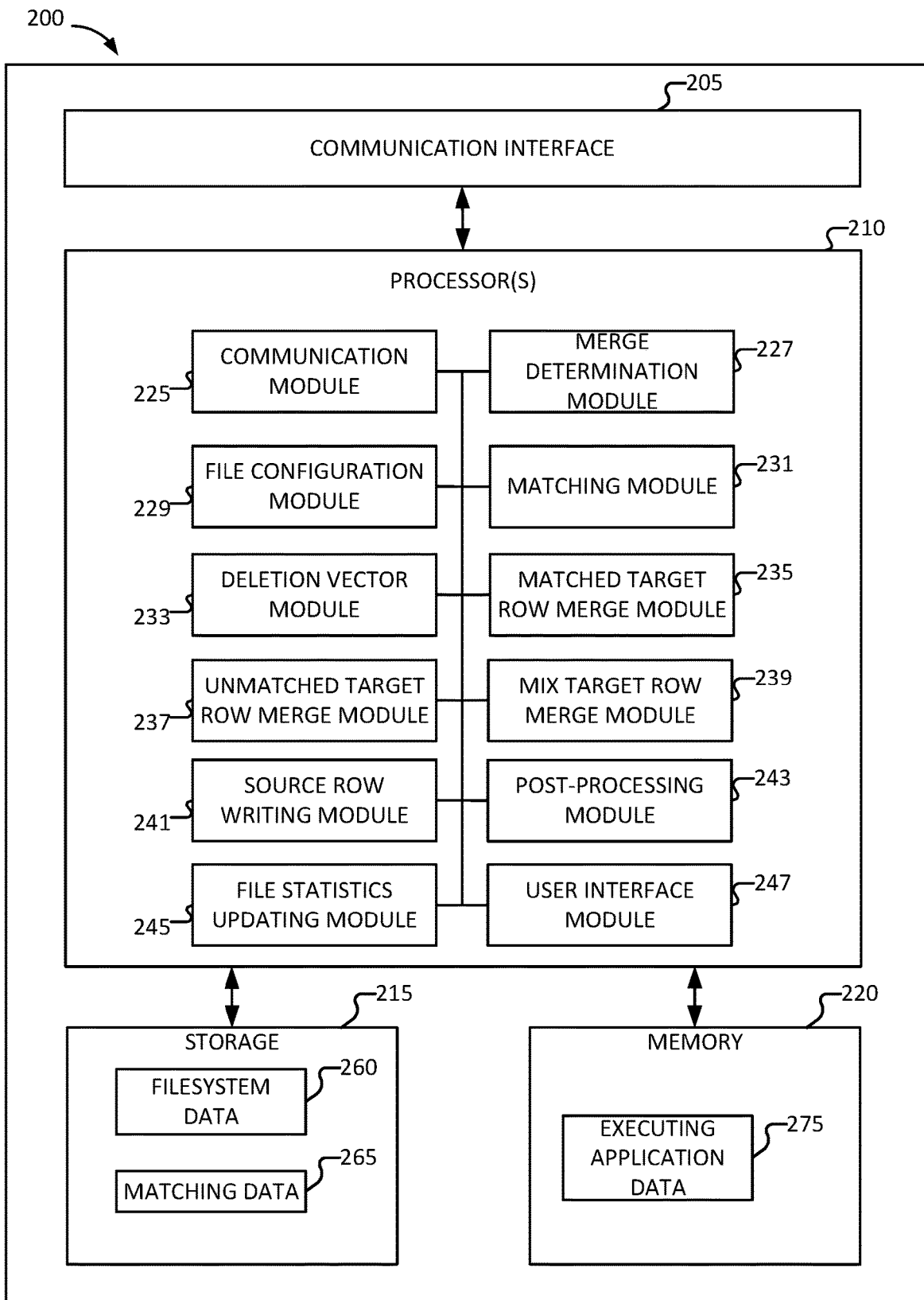
FIG. 2 is a block diagram of a data merging service according to various embodiments of the present application.

FIG. 2 is a block diagram of a data merging service according to various embodiments of the present application. In some embodiments, system 200 implements process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, and/or process 1800 of FIG. 18.

In the example shown, system 200 implements one or more modules in connection with managing data, merging data comprised in target table(s) and source data, and/or performing a post-processing of resulting files or the resulting table, etc. System 200 comprises communication interface 205, one or more processors 210, storage 215, and/or memory 220. One or more processors 210 comprises, or implements, one or more of communication module 225, merge determination module 227, file configuration module 229, matching module 231, deletion vector module 233, matched target row merge module 235, unmatched target row merge module 237, mix target row merge module 239, source row writing module 241, post-processing module 243, file statistics updating module 245, and/or user interface module 247.

In some embodiments, system 200 comprises communication module 225. System 200 uses communication module 225 to communicate with various other systems such as a user system, an administrator system, a data source (e.g., from which files comprising information to be ingested are received), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request to configure a data merging service, a data management policy, a security policy, an access policy, a compaction policy, a mixing policy, a deletion vector policy, a storage system configuration such as a configuration for a partitioning of data, a configuration of metadata associated with a target table, a query for data, a selection of a corrective action, etc. The user input to the user system can include the creation of a new file, a modification or update to a file, a merging of target data (e.g., a target table) and source data (e.g., a source table), a query for a file (e.g., a csv file, a library, a module, etc.), a query for a data entity, a request to set one or more security policies (e.g., a permission with respect to accessing a file or a directory), etc. Communication module 225 is configured to provide various user systems or data requesting services with information such as a user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates data responsive to data requests (e.g., queries to a dataset that has been clustered into a set of files, etc.).

In some embodiments, system 200 comprises merge determination module 227. System 200 uses merge determination module 227 to determine whether to merge target data and source data. Merge determination module 227 may determine to merge a target table and source data based on a request from a user (e.g., via a client system) or from another service or system. Merge determination module 227 can determine the target table and the source data to be merged based on the request to perform the merge or update. In some embodiments, in response to determining to perform the merge with respect to the target table and the source data, merge determination module 227 can invoke one or more jobs in connection with performing the merge (e.g., the first job, the second job, the third job, the fourth job, and/or the fifth job).

In some embodiments, system 200 comprises file configuration module 229. System 200 uses file configuration module 229 to determine whether to configure/re-configure the target data and/or the source data, and to correspondingly configure such data.

With respect to the target data, such as a target table, file configuration module 229 determines whether to reconfigure the target table based at least in part on a size of the target table. File configuration module 229 determines whether a file of the target table is greater than a predefined file size threshold. For example, some files can be extremely large such as on the order of 1 GB. If the file(s) to be written via the second job and third job are significantly large and a small number of files are to be written, then the utilization of the compute resources allocated to performing the merge of the target table with the source data is suboptimal. Further, allocating additional compute resources may not improve processing the single file because each file is processed by a single compute resource. File configuration module 229 can use the predefined file size threshold to determine whether to segment the file into a set of smaller files, which can then be processed in parallel by the compute resources. The segmentation of the file(s) into smaller files and parallel processing of the files can improve the perceived latency for performing the merge. For example, if a single large file of file size 1 GB would be written, the segmentation of the file into five smaller files and parallel processing of the file smaller files (e.g., among 5 concurrent processes) can lead to an improvement in cost/efficiency of five times the cost/efficiency of processing the single large file. The segmentation of a larger file and parallel processing the smaller files can be implemented for those file formats that support segmentation (e.g., files having the Apache Parquet file format).

With respect to the source data, file configuration module 229 determines whether the source data is keyed (e.g., indexed in a similar manner to the target table with which the source data is to be merged). If the source data is keyed, then file configuration module 229 can determine that the source data does not require further configuration, and system 200 uses the source data keys and target table keys to perform the merge (e.g., to determine matched rows and unmatched rows). Conversely, in response to determining that the source data is not keyed (e.g., the data can be a complex query, which may be a combination of tables), file configuration module 229 uses the source data to instantiate a source table that is keyed/indexed in accordance with the keying/indexing of the target table. The target table can be keyed based on including a column in the target table that includes a key for the various records (e.g., key identifiers). System 200 can then use the instantiated source table in connection with merging the target table with the source data.

In some embodiments, system 200 comprises matching module 231. System 200 uses matching module 231 to determine matching target table files and matching source data records. For example, matching module 231 is invoked in connection with performing the first job. Matching module 231 determines matched rows (e.g., matching target table files and matching source data records) and stores an indication of such matched rows. In some embodiments, matching module 231 also determines unmatched rows (e.g., matching target table files with no matching source data records) and stores an indication of such unmatched rows. Matching module 231 determines which target table files had a record that matched a record in the source data. For example, for each target table row, the system remembers (e.g., stores an indication of) which file from which the row was obtained, and after the join operation performed with respect to the source data, matching module 231 remembers which target table files are invoked in the output of the join operation.

In some embodiments, system 200 comprises deletion vector module 233. System 200 uses deletion vector module 233 to persist deletion vectors with respect to a target table or resulting table and to determine the deletion vectors associated with a target table in connection with performing a merge with respect to the target table and source data. In some embodiments, the deletion vectors are associated with one or more previously removed rows of the target table files (e.g., the matching target table files). A deletion vector may also be associated with a row to be removed from a target table file. Information pertaining to the deletion vector(s) is stored in association with the target table or resulting table after the merge. For example, the information pertaining to the deletion vector is stored as metadata comprised in (or associated with) the target table or resulting table, as applicable. Deletion vector module 233 can obtain the indication of the deletion vectors associated with the target table in connection with performing the first job or the fifth job (e.g., a job in which the deletion vectors are written across deletion vector files). Deletion vector module 233 can provide the indication of the deletion vectors associated with a target table when system 200 (e.g., matching module 231) determines matched rows for matching target table files, or to matched target row merge module 235 when the matching action is to be performed. For example, system 200 uses the deletion vectors as an indication of the rows in the target table files to ignore when performing the merge between the target table and the source data.

In some embodiments, deletion vector module 233 determines the deletion vectors while performing the first job so that system 200 knows which rows to not pass to the second job. For example, a modified first job is performed, wherein the first job includes (x) determining a set of matching target table files comprising the one or more target table files for which the source table has one or more matching source table records, (y) performing the first job further comprises determining a set of deletion vectors corresponding to the one or more target table files, and (z) storing target table information indicating the set of matching target table files, and for each of the set of matching target table files, a particular set of rows having matching rows in the one or more matching source table records. In addition to determining the deletion vectors for previously deleted rows in the target table files, deletion vector module 233 (e.g., in connection with performing the first job) can determine a set of deletion vectors, if any, for rows that are to be deleted from the target table.

In some embodiments, deletion vector module 233 persists the deletion vectors associated with a target table and/or a resulting table obtained based on the merging of the target table and source data. Deletion vector module 233 can persist the deletion vectors in one or more deletion vector files. The deletion vectors can be stored across one or more deletion vector files in accordance with a predefined deletion vector policy. As an example, the predefined deletion vector policy can indicate one or more of (i) a maximum size threshold for the one or more deletion vector files, (ii) a minimum size threshold for the one or more deletion vector files, and/or (iii) a particular target table file is to be stored in a particular deletion vector file. As another example, the predefined deletion vector policy can be implemented on a compute-resource basis such that each compute resource stores deletion vectors for parts of the target table being processed by the compute resource in a different set of one or more deletion vector files. Deletion vector module 233 can persist the deletion vectors based on performing a fifth job. The fifth job can include storing in the one or more deletion vector files an indication of deletion vectors associated with one or more target table files. In some embodiments, deletion vector module 233 can persist the deletion vectors based on performing a first job; and the first job can include storing in the one or more deletion vector files an indication of deletion vectors associated with one or more target table files.

In some embodiments, system 200 comprises matched target row merge module 235. System 200 uses matched target row merge module 235 to perform a merging of the matched rows (e.g., matched rows of matching target table files and matched records of the source data). Matched target row merge module 235 can be invoked in connection with performing the second job (e.g., the primary second job, or the secondary second job modified to include a mix in of certain unmatched rows). Matched target row merge module 235 performs a second job (also referred to herein as the primary second job) based at least in part on certain rows of the target table and certain records of the source data to be merged. Matched target row merge module 235 performs the matching action based at least in part on the results of performing the first job. For example, matched target row merge module 235 uses the indications of matched rows in connection with determining rows of the target table and records of the source data for which the matching action is to be performed. Matched target row merge module 235 can obtain the indication of matched rows and indication of which file from which the matched row of the target table to determine the target table files and source data records to be subject to the second job.

Matched target row merge module 235 performs the matching action based on scanning the matched target table rows and the corresponding records of the source data (e.g., matched rows of the source table) and performing a join operation with respect to such matched rows. The join operation can be a right outer join or an inner join. The scanning of the matched target table rows can include reading the entire rows for the matching target table files (e.g., the files corresponding to the matched rows of the target table). In some embodiments, matched target row merge module 235 performs the join operation on the matched rows. In some embodiments, matched target row merge module 235 only performs the matching action with respect to matching rows of matching target table files (e.g., matched rows of the files corresponding to matched rows of the target table). For example, unmatched rows are not scanned and joined in connection with the second job. In response to performing the join operation, matched target row merge module 235 applies the applicable changes. For example, matched target row merge module 235 merges the data in the matched target table rows in accordance with the source data. In response to merging the data in the matched rows, matched target row merge module 235 stores the resulting data (e.g., the data changed in accordance with the source data) in corresponding resulting files (e.g., second job resulting files). As an example, if files A, B, and C correspond to matched table rows, the system stores files E, D, and F respectively corresponding to files, A, B, and C modified in accordance with the source data. In some embodiments, performing the merging of matched rows of matching target table files and matched records of the source data includes storing, for each file corresponding to a matched row, a corresponding resulting file(s).

In some embodiments, matched target row merge module 235 performs the matching action based on pre-filtering out one or more of (i) unmatched source data records (e.g., unmatched rows of the source table) from the source data, and (ii) unmatched rows of matched target table rows (e.g., rows in the files of the matched target table rows for which the source data has no corresponding record). In some embodiments, matched target row merge module 235 scans the source table to obtain only matched source data records (e.g., rows in the source table having a corresponding row in the target table.

In some embodiments, system 200 comprises unmatched target row merge module 237. System 200 uses unmatched target row merge module 237 to store information pertaining to unmatched rows of the matching target table files and/or unmatched rows of unmatched target table files. In some embodiments, unmatched target row merge module 237 is invoked in connection with system 200 performing a third job. The third job is performed with respect to one or more records/rows that were not subject to the second job. For example, the third job is performed with respect to unmatched rows. As another example, the third job is performed with respect to unmatched rows of matched target table files (e.g., target table files having at least one matching row). In some embodiments, the third job is performed with respect to unmatched target table rows (e.g., only unmatched target table rows). Unmatched target row merge module 237 determines the unmatched target table rows based on the results of the first job.

If system 200 implements the secondary second job in which certain unmatched rows of matching target table files are processed under the second job, unmatched target row merge module 237 processes the remaining unmatched rows, or unmatched rows that were not otherwise processed by such second job.

In some embodiments, system 200 comprises unmatched target row merge module 237. System 200 uses mix target row merge module 239 in connection with implementing the secondary second job in which certain unmatched rows of matching target table files are processed under the second job. Mix target row merge module 239 can perform such second job based at least in part on a predefined mixing policy. For example, the predefined mixing policy indicates one or more mixing rules or mixing heuristics according to which a set of unmatched rows of matching target table files are selected to be processed in such second job (e.g., rather than the third job). Mix target row merge module 239 scans (e.g., obtains) unmatched rows in matching target table files, and performing a union operation with respect to the output from process of the primary second job (e.g., the changes being applied with respect to the matching rows of matching target table files).

In some embodiments, system 200 implements matched target row merge module 235 to perform the matching action with respect to matched rows of the matching target table files and implements mix target row merge module 239 to select the unmatched rows of certain matched target table files to be processed under a second job. Mix target row merge module 239 performs a union operation for (i) the information obtained from the matching action with respect to matched rows of the matching target table files, and (ii) the selected unmatched rows of certain matched target table files to be processed under a second job.

Examples of the one or more mixing heuristics include (i) determining to mix a threshold number of files, (ii) determining to mix in files that combine up to a predefined maximum size threshold (e.g., the aggregated size of the files to be mixed in is less than the maximum size threshold), (iii) determining to mix in files that chat combine to be less than a predefined minimum size threshold), (iv) selecting a set of smallest files first (e.g., the files to be mixed in are selected based on an order of file size from smallest to largest up to a threshold number of files or otherwise based on another mixing heuristic), (v) having a preference to mix in a set of smallest files that combine up to a predefined maximum size threshold, (vi) selecting a set of files to mix such that the files to be mixed in combine to exceed a predefined minimum size threshold by as little as possible, (vii) selecting files to be mixed in based on a determination that a mixed-in unmodified data and the modified data are expected to match (e.g., be within a threshold size), etc. Various other mixing heuristics may be implemented. In some embodiments, the system determines the subset of the unmatched rows in matching files to be input to the secondary second job on a per-partition basis or for each partition separate from the determination made for other partitions).

In some embodiments, system 200 comprises source row writing module 241. System 200 uses source row writing module 241 to store information for unmatched rows/records of the source data. For example, system 200 uses source row writing module 241 to perform the fourth job. Source row writing module 241 performs the fourth job with respect to unmatched source data records. For example, source row writing module 241 determines source table rows that do not have a corresponding/matching target table row and performs the fourth job. Source row writing module 241 scans the source data to obtain the unmatched source data records and re-writes such unmatched source data records into one or more new files (e.g., one or more fourth job resulting files). In some embodiments, source row writing module 241 writes out all the unmatched source data records into a single fourth job resulting file. In some embodiments, the re-written records is transformed—for example, the output records may be different from the source rows so that writing module 241 writes records into one or more new files in accordance with the unmatched source data records (e.g., written to match schema or format or syntax).

In some embodiments, system 200 comprises post-processing module 243. System 200 uses post-processing module 243 to perform a post-processing with respect to files resulting from the second job, the third job, the fourth job, and/or the fifth job. Post-processing module 243 can determine whether to perform a compaction of two or more resulting files, and in response to determining that a compaction is to be performed, post-processing module 243 performs the compaction with respect to two or more of the resulting files. For example, post-processing module 243 creates a single file comprising the information of a plurality of files. Using the illustrative example above, if the resulting files include A', B', C', D, E, F, and G, post-processing module 243 performs a compaction of files B' and C' to obtain file H, and a compaction of files E, F, and G to obtain file I. Accordingly, the resulting files is reduced to A', H, and I. In some embodiments, post-processing module 243 performs the compaction with respect to the plurality of resulting files based at least in part on one or more predefined compaction thresholds. The one or more compaction thresholds can include a large file threshold and/or a small file threshold. As an example, post-processing module 243 can determine to compact a set of files having a file size less than the predefined compaction threshold(s) (e.g., the small file threshold). As another example, post-processing module 243 can exclude files having a file size higher than a predefined compaction threshold(s) (e.g., the large file threshold).

In some embodiments, post-processing module 243 uses one or more post-processing heuristics in connection with determining whether to perform a post-processing of the resulting files (e.g., performing a compaction with respect to one or more resulting files, etc.). Examples of the one or more post-processing heuristics include (i) clustering property preservation (e.g., combining only files that include similar data, combining files that are adjacent in a total or partial ordering of files), (ii) bin packing files according to a predefined bin packing scheme (e.g., to achieve files that are as close as possible to a predetermined size), (iii) determining not to combine files if a number of resulting files is less than a predetermined resulting file threshold (e.g., to avoid performing unnecessary work), (iv) combining files based on when the files were created (e.g., based on the files having a similar age, or an age within a threshold age difference, etc.), (v) combining files based on a determination that the files to be combined are comprised in a same partition of the resulting table (e.g., if the resulting table is partitioned into multiple partitions), (vi) determining not to combine a first file with a second file if the first file has a size larger than a predefined file size threshold, (vii) determining not to combine a first file and a second file if the resulting file is expected to have a size larger than a predefined file size threshold, (viii) determining to combine a plurality of file to obtain a number of combined files less than a predefined file number threshold (or such that the expected number of resulting files after the combining would be less than the predefined file number threshold), (ix) determining whether to combine a plurality of files based on an expected amount of time to be used to combining the files (e.g., such that the expected amount of time is less than a predefined time threshold), etc. Various other post-processing heuristics may be implemented.

In some embodiments, system 200 comprises file statistics updating module 245. System 200 uses file statistics updating module 245 to update statistics of the resulting table or the one or more resulting files obtained based on the second job, the third job, the fourth job, and/or the fifth job.

In some embodiments, file statistics updating module 245 is integrated with post-processing module 243.

System 200 stores metadata indicating a set of statistics for the target table, resulting table, or corresponding files. Examples of the statistics may include a minimum value, a maximum value, and a null value (e.g., a number of nulls for a particular column). As system 200 generates resulting files from the various jobs (e.g., second job resulting files, third job resulting files, fourth job resulting files, etc.) the range of values in the files may change, etc. In response to obtaining the resulting table, file statistics updating module 245 performs a post-processing operation to update metadata statistics for files of the resulting table. File statistics updating module 245 can determine the min/max for each file of the resulting table and update the metadata associated with such files/resulting table, accordingly. As an example, if the target table has file A and a deletion vector that is associated with one or more rows in file A, file statistics updating module 245 determines whether the deletion vector associated with file A changes the min/max value(s) for file A. In response to determining that the deletion vector associated with file A changes the min/max value(s) for file A, file statistics updating module 245 updates the metadata associated with file A to reflect the state of file A as modified by the deletion vector.

In some embodiments, system 200 comprises user interface module 247. System 200 uses user interface module 247 to provide a user interface to a user (e.g., via a client system, etc.) via which the user configures, defines, develops data entities, policies, target data, source data, access permissions with respect to the data recipients and/or data entities, and/or request merging or updating of a target table, etc.

According to various embodiments, storage 215 comprises one or more of file system data 260, matching data 265. Storage 215 comprises a shared storage (e.g., a network storage system) and/or database data, and/or user activity data.

In some embodiments, file system data 260 comprises a database such as one or more datasets for data entities (e.g., one or more datasets for one or more features, models, schemas, tables, etc.). File system data 260 can store various policies such as a compaction policy, a mixing policy, a deletion vector policy, etc.

In some embodiments, matching data 265 comprises information pertaining to information ingested (e.g., parsed) from the target table and/or the source data. Matching data 265 can comprise an indication of matching rows of the target table files, matching records of the source data, unmatched rows of the target table files, deletion vectors applied with respect to the target table, etc.

According to various embodiments, memory 220 comprises executing application data 275. Executing application data 275 comprises data obtained or used in connection with executing an application such as an application executing in connection with managing data entities, an application executing to process jobs, an application that processes and/or responds to queries, an application that merges target data and source data, an application that executes code being developed in a workspace, etc. In various embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
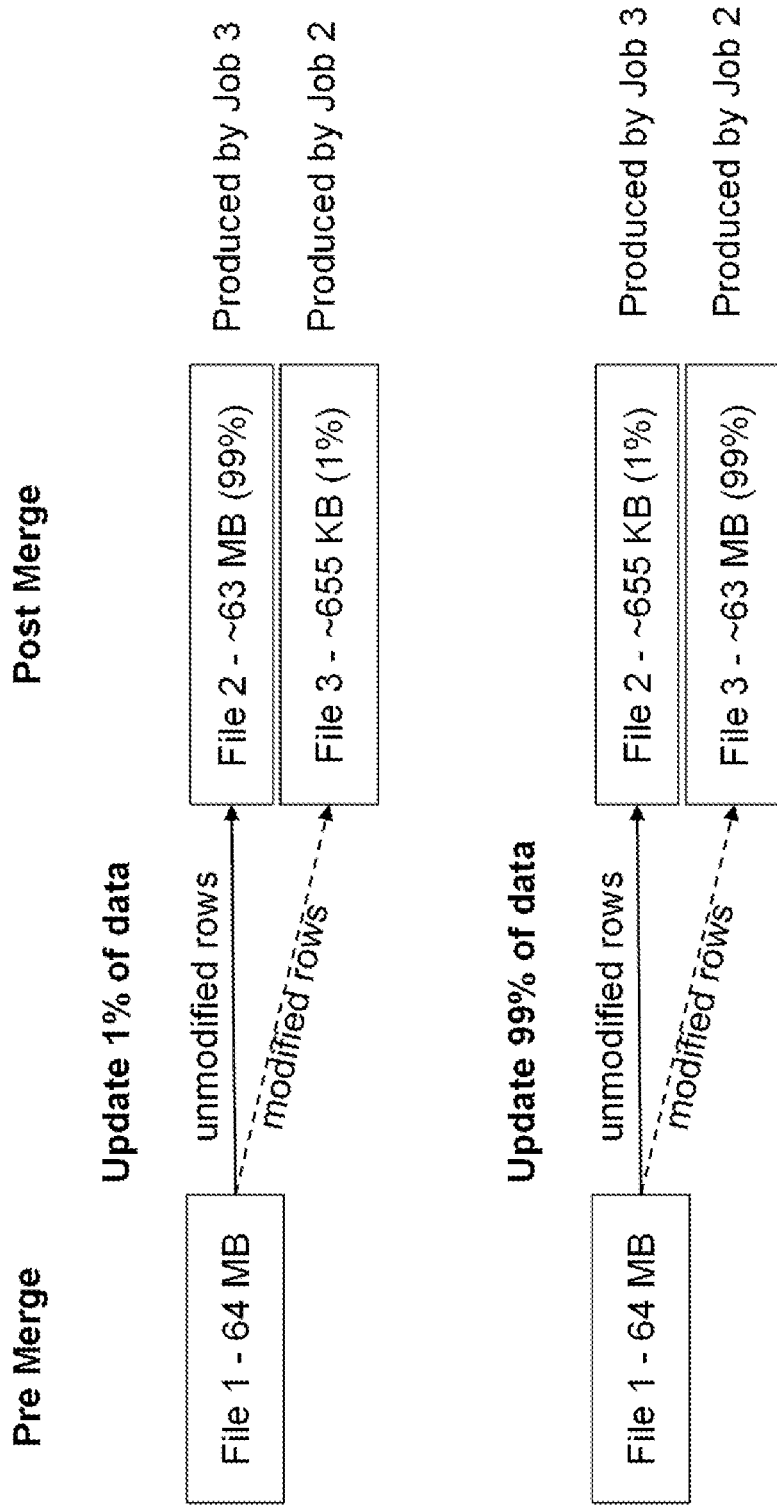
FIG. 3 is an illustration of an example of files created in connection with merging target data and source data according to various embodiments of the present application.

FIG. 3 is an illustration of an example of files created in connection with merging target data and source data according to various embodiments of the present application.

The examples shown in FIG. 3 provide an illustration of the various statistics of files generated during a merging of a target table with source data based on an amount of data that is updated.

In the case that 1% of a target table is updated, the merging operation according to various embodiments will generate two files (e.g., file 2 and file 3). The file 2 generated in connection with performing the third job (e.g., the unmatched rows of the matching target table files) will have a size of about 63 MB if the original file has a file size of 64 MB, and such file 3 corresponding to about 99% of the data from the initial file. The file 3 generated in connection with performing the second job (e.g., the matched rows of the matching target table files) will have a size of about 655 KB if the original file has a file size of 64 MB, and such file 2 corresponding to about 1% of the data from the initial file.

Conversely, in the case that 99% of the data in the initial file is updated in the merge operation, then the file 2 generated in connection with performing the third job will have a size of about 655 KB, and the file 3 generated in connection with performing the second job will have a size of about 63 MB. Accordingly, in the case that 99% of the data in the initial file is updated, the second job will be much more computationally intensive than in the case that 1% of the data in the initial file is updated.

Figure 4:
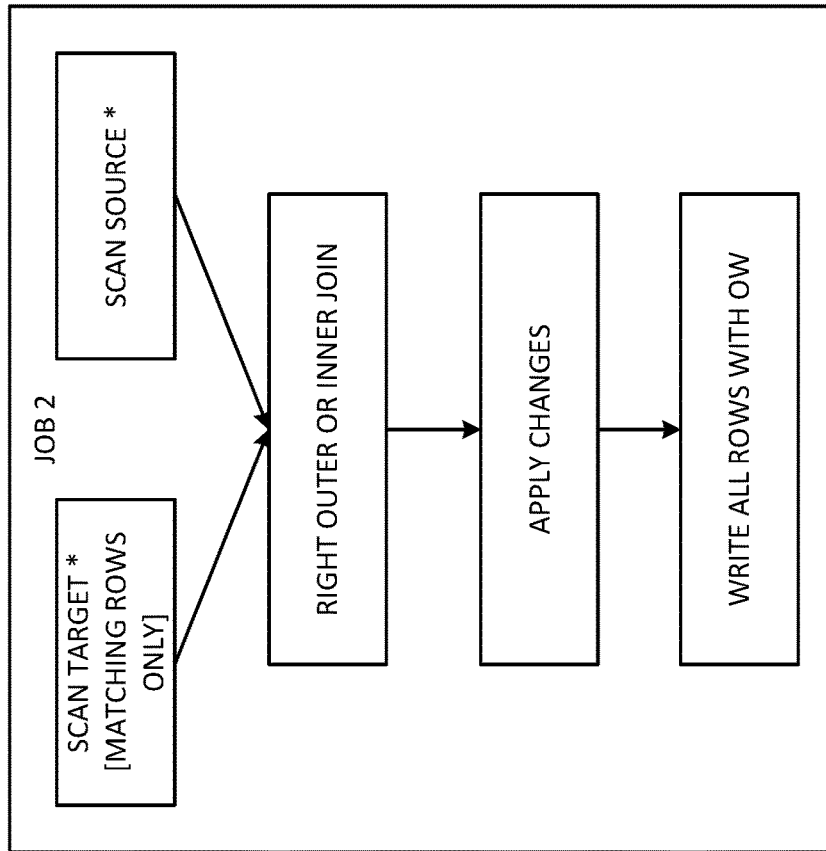
FIG. 4 is a flow diagram of a method for updating data according to various embodiments of the present application.
Figure 4:
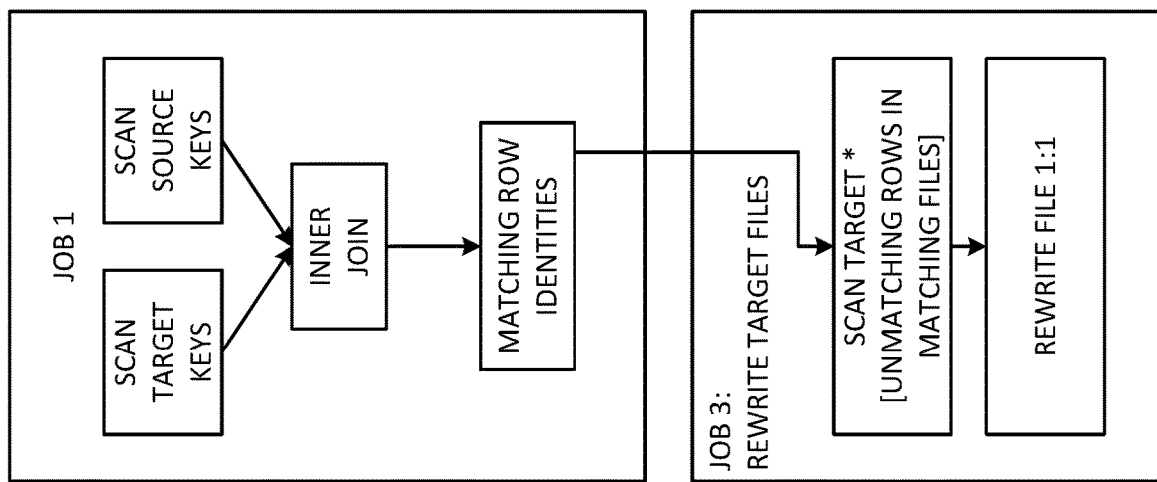

FIG. 4 is a flow diagram of a method for updating data according to various embodiments of the present application. In some embodiments, process 400 is implemented by data merging service 110 of system 100 of FIG. 1 and/or system 200 of FIG. 2.

As illustrated in FIG. 4, the system performs a first job to determine one or more matching rows for matching target table files. The first job includes scanning the keys for the target table, scanning the keys for the source data, and performing an inner join to determine the matching rows for the target table files. For example, matched rows are determined to be those rows for which an index of the target table has the same value as an index for the source data. The system stores an indication (e.g., an identifier) for the one or more matching rows and/or matching target table files.

In response to performing the first job, the system performs a second job. As illustrated in FIG. 4, the second job includes scanning applicable portions of the target table and the scan source and performing a matching action. For example, the system scans matching rows of matching target table files and the source data. As another example, the system scans only matching rows of the matching target table files and the source data. The source data scanned in the second job can include all records in the source data, or only those matched records of the source data that match a row of a matching target table file. In response to scanning in the matching rows of matching target table files and the source data, the system performs a right outer join or an inner join and applies the changes. The system then writes the rows (e.g., the updated/modified rows) to one or more second job resulting files.

In response to performing the first job, the system performs a third job (e.g., in serial or parallel with performing the second job). As illustrated in FIG. 4, the third job includes scanning unmatched rows of the matching target files and writing such unmatched rows of the matching target files to one or more corresponding third job resulting files. In some embodiments, the third job writes a third job resulting file for each matching target file processed by the third job.

Figure 5:
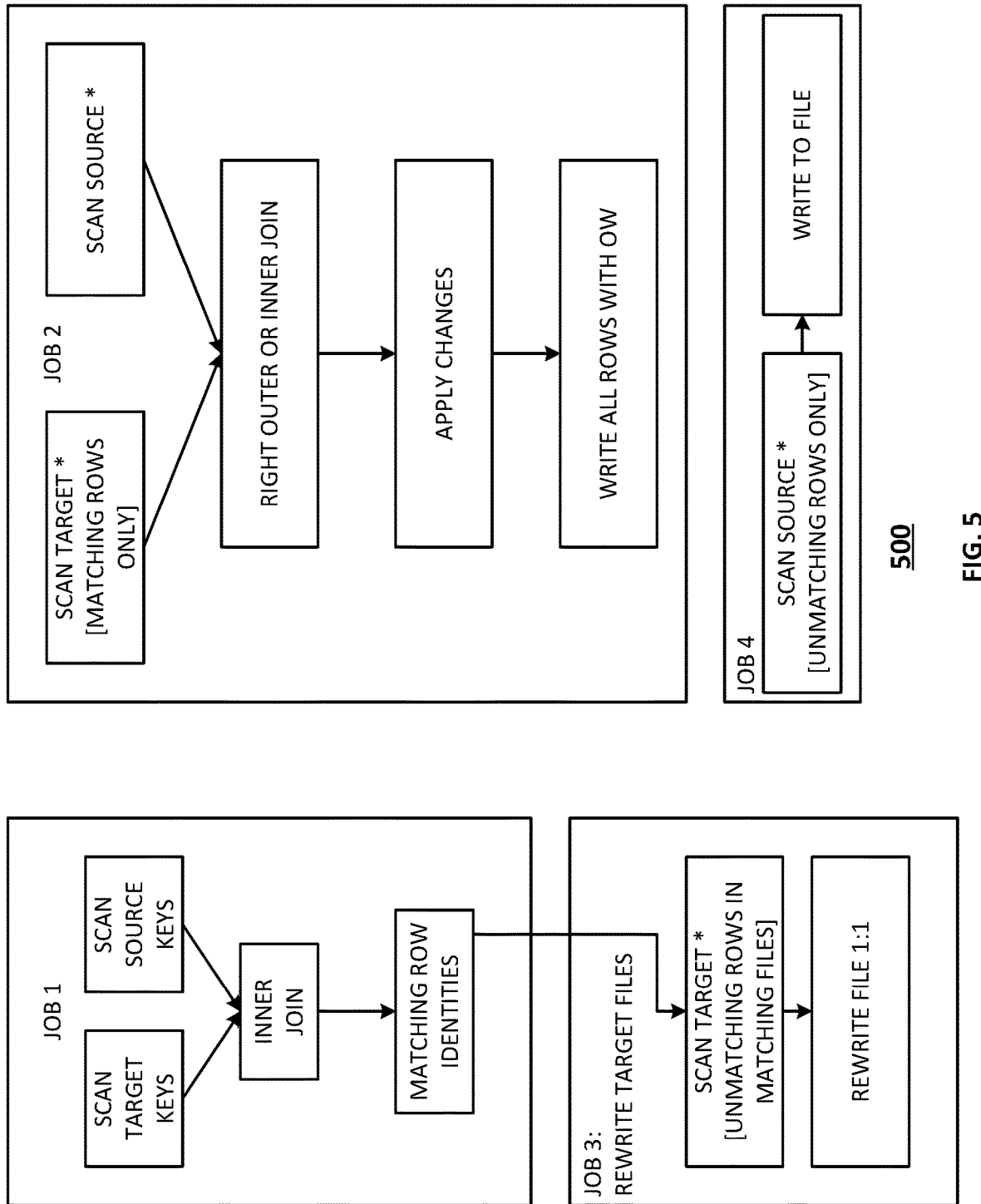
FIG. 5 is a flow diagram of a method for updating data according to various embodiments of the present application.

FIG. 5 is a flow diagram of a method for updating data according to various embodiments of the present application. In some embodiments, process 500 is implemented by data merging service 110 of system 100 of FIG. 1 and/or system 200 of FIG. 2.

As illustrated in FIG. 5, the system performs a first job to determine one or more matching rows for matching target table files. The first job includes scanning the keys for the target table, scanning the keys for the source data, and performing an inner join to determine the matching rows for the target table files. For example, matched rows are determined to be those rows for which an index of the target table has the same value as an index for the source data. The system stores an indication (e.g., an identifier) for the one or more matching rows and/or matching target table files.

In response to performing the first job, the system performs a second job. As illustrated in FIG. 5, the second job includes scanning applicable portions of the target table and the scan source and performing a matching action. For example, the system scans matching rows of matching target table files and the source data. As another example, the system scans only matching rows of the matching target table files and the source data. The source data scanned in the second job can include all records in the source data, or only those matched records of the source data that match a row of a matching target table file. In response to scanning in the matching rows of matching target table files and the source data, the system performs a right outer join or an inner join and applies the changes. The system then writes the rows (e.g., the updated/modified rows) to one or more second job resulting files.

In response to performing the first job, the system performs a third job (e.g., in serial or parallel with performing the second job and/or fourth job). As illustrated in FIG. 5, the third job includes scanning unmatched rows of the matching target files, and writing such unmatched rows of the matching target files to one or more corresponding third job resulting files. In some embodiments, the third job writes a third job resulting file for each matching target file processed by the third job.

In response to performing the first job, the system performs a fourth job (e.g., in serial or parallel with performing the second job and/or third job). As illustrated in FIG. 5, the fourth job includes scanning the source data for the unmatched source records (e.g., the unmatched source rows) and writing such unmatched source records to a fourth job resulting file. In some embodiments, the fourth job processes the records (e.g., rows) of the source data that was not processed by the second job. For example, if the second job is optimized to only read the matched source records (e.g., to reduce the amount of source data to be transferred across the network of the second job and to reduce the amount of data subject to the computationally intensive join operations), the fourth job can process the unmatched source records.

Figure 6:
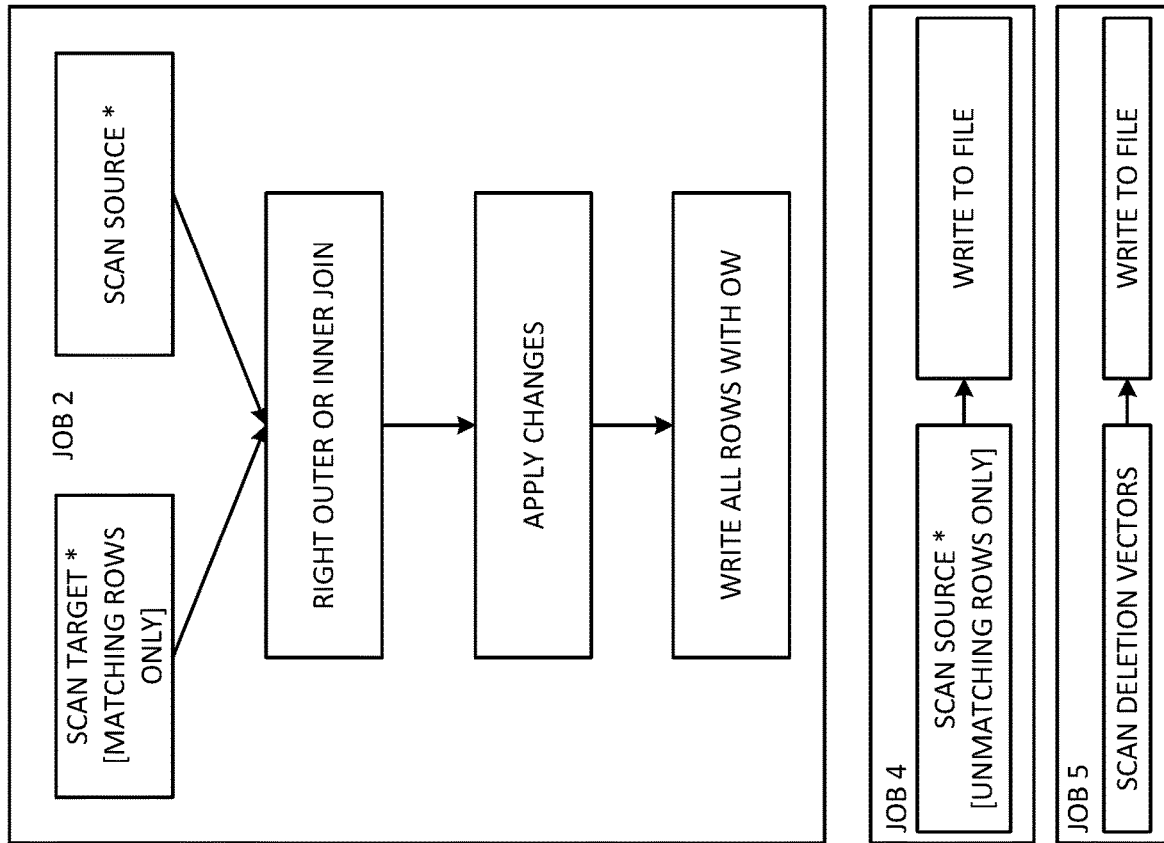
FIG. 6 is a flow diagram of a method for updating data according to various embodiments of the present application.
Figure 6:
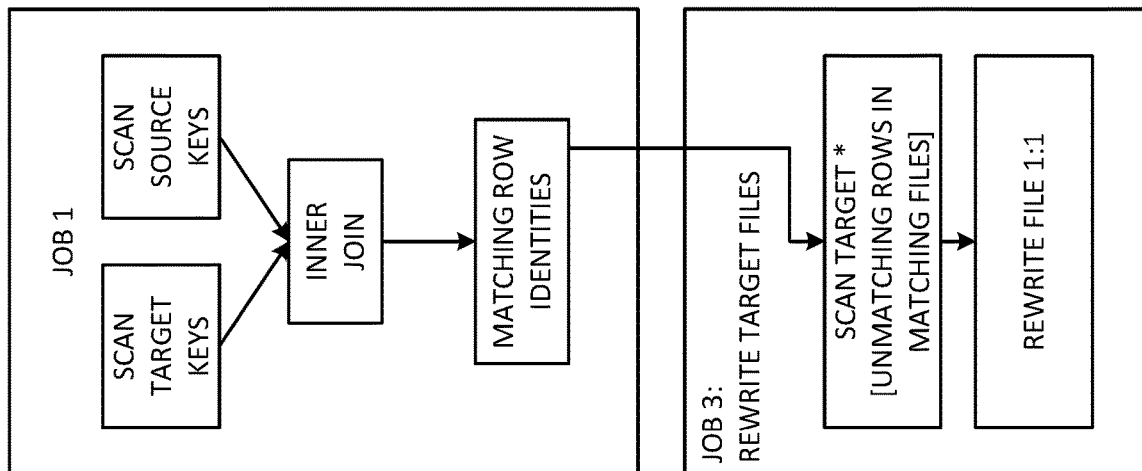

FIG. 6 is a flow diagram of a method for updating data according to various embodiments of the present application. In some embodiments, process 600 is implemented by data merging service 110 of system 100 of FIG. 1 and/or system 200 of FIG. 2.

As illustrated in FIG. 6, the system performs a first job to determine one or more matching rows for matching target table files. The first job includes scanning the keys for the target table, scanning the keys for the source data, and performing an inner join to determine the matching rows for the target table files. For example, matched rows are determined to be those rows for which an index of the target table has the same value as an index for the source data. The system stores an indication (e.g., an identifier) for the one or more matching rows and/or matching target table files.

In response to performing the first job, the system performs a second job. As illustrated in FIG. 6, the second job includes scanning applicable portions of the target table and the scan source and performing a matching action. For example, the system scans matching rows of matching target table files and the source data. As another example, the system scans only matching rows of the matching target table files and the source data. The source data scanned in the second job can include all records in the source data, or only those matched records of the source data that match a row of a matching target table file. In response to scanning in the matching rows of matching target table files and the source data, the system performs a right outer join or an inner join and applies the changes. The system then writes the rows (e.g., the updated/modified rows) to one or more second job resulting files.

In response to performing the first job, the system performs a third job (e.g., in serial or parallel with performing the second job, fourth job, and/or fifth job). As illustrated in FIG. 6, the third job includes scanning unmatched rows of the matching target files, and writing such unmatched rows of the matching target files to one or more corresponding third job resulting files. In some embodiments, the third job writes a third job resulting file for each matching target file processed by the third job.

In response to performing the first job, the system performs a fourth job (e.g., in serial or parallel with performing the second job, third job, and/or fifth job). As illustrated in FIG. 6, the fourth job includes scanning the source data for the unmatched source records (e.g., the unmatched source rows) and writing such unmatched source records to a fourth job resulting file. In some embodiments, the fourth job processes the records (e.g., rows) of the source data that was not processed by the second job. For example, if the second job is optimized to only read the matched source records (e.g., to reduce the amount of source data to be transferred across the network of the second job and to reduce the amount of data subject to the computationally intensive join operations), the fourth job can process the unmatched source records.

In response to performing the first job, the system performs a fifth job (e.g., in serial or parallel with performing the second job, third job, and/or fourth job). In some embodiments, the fifth job is integrated into the first job. The fifth job can be performed in the case that the system persists deletion vectors associated with the target table and/or resulting table. As illustrated in FIG. 6, the fifth job includes scanning the one or more deletion vectors associated with the target table and storing the one or more deletion vectors across one or more deletion vector files. The system can store the one or more deletion vectors across one or more deletion vector files based at least in part on a deletion vector policy. The one or more deletion vectors stored across the one or more deletion vector files can include an existing deletion vector that is associated with the target table and a new deletion vector corresponding to a new deletion to be performed during the update of the target table. In some embodiments, the system implements a modified first job in which the system determines the one or more deletion vectors associated with the target table (e.g., existing deletion vectors, new deletion vectors, etc.) and stores an indication of such deletion vectors, which is then used by the fifth job to write the one or more deletion vector files.

Figure 7:
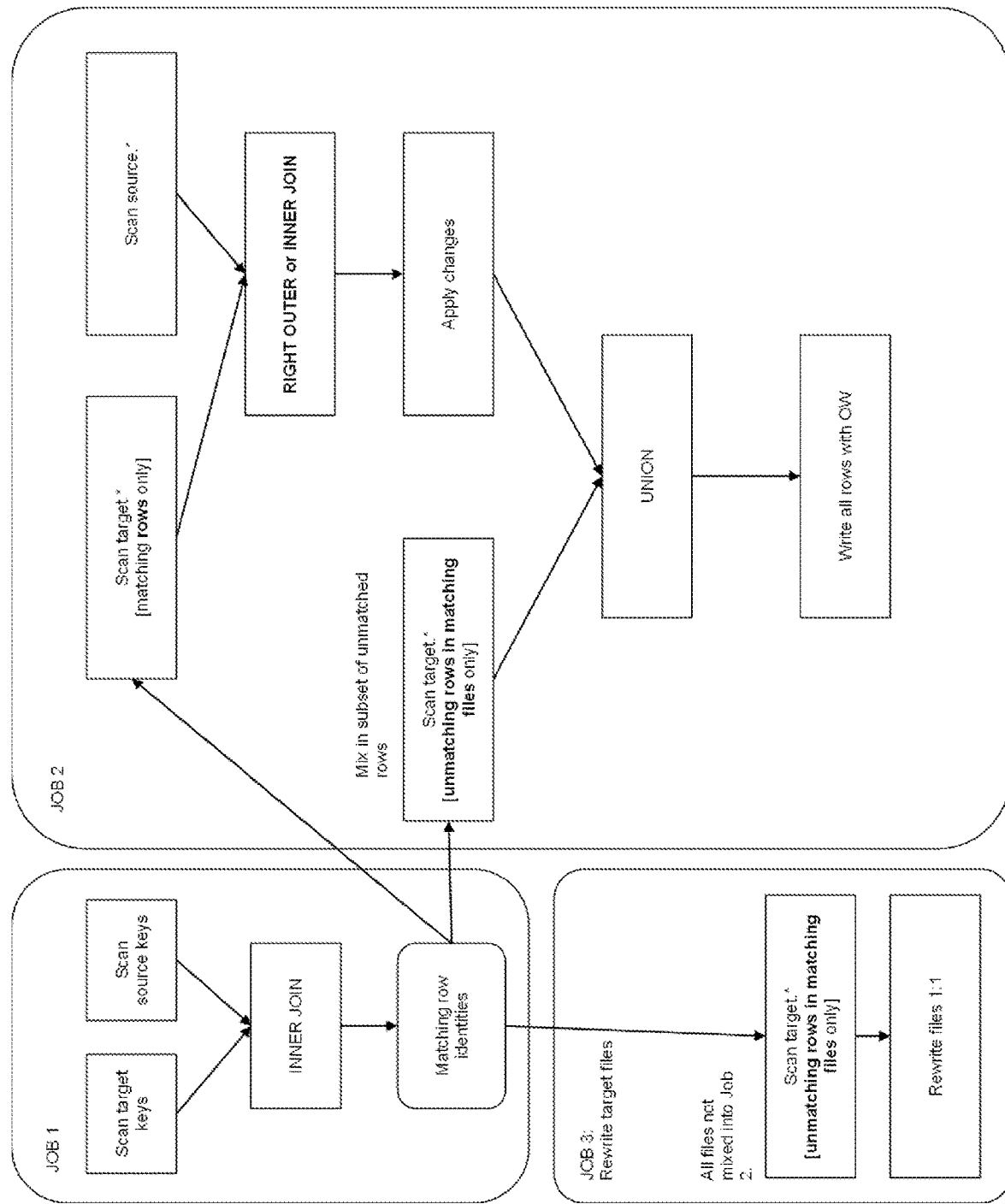
FIG. 7 is a flow diagram of a method for updating data according to various embodiments of the present application.

FIG. 7 is a flow diagram of a method for updating data according to various embodiments of the present application. In some embodiments, process 700 is implemented by data merging service 110 of system 100 of FIG. 1 and/or system 200 of FIG. 2.

In some embodiments, the system is further optimized by implementing a modified second job (e.g., a secondary second job) and a modified third job to reduce the number of files being written and/or to improve data locality. The system implements a mixing policy according to which the system mixes in certain unmatched rows of matching target table files to the second job.

As illustrated in FIG. 7, the system performs a first job to determine one or more matching rows for matching target table files. The first job includes scanning the keys for the target table, scanning the keys for the source data, and performing an inner join to determine the matching rows for the target table files. For example, matched rows are determined to be those rows for which an index of the target table has the same value as an index for the source data. The system stores an indication (e.g., an identifier) for the one or more matching rows and/or matching target table files.

In response to performing the first job, the system performs a second job such as the modified second job according to which certain unmatched rows of matching target table files are processed under the second job. In some embodiments, the system selects one or more unmatched rows of matching target table files to process under the second job based at least in part on a mixing policy. As illustrated in FIG. 7, the second job includes the second job scanning applicable portions of the target table and the scan source and performing a matching action. For example, the system scans matching rows of matching target table files and the source data. As another example, the system scans only matching rows of the matching target table files and the source data. The source data scanned in the second job can include all records in the source data, or only those matched records of the source data that match a row of a matching target table file. In response to scanning in the matching rows of matching target table files and the source data, the system performs a right outer join or an inner join and applies the changes. The system scans in the selected unmatched rows of matching target table files. The system performs a union operation with respect to the selected unmatched rows of the matching target table files and the results of the matching action between the matched rows of the matching target table files and the source data. The system then writes the rows (e.g., the updated/modified rows and the selected unmatched rows in the matching target table files) to one or more second job resulting files.

In response to performing the first job, the system performs a third job (e.g., in serial or parallel with performing the second job). As illustrated in FIG. 7, the third job includes scanning unmatched rows of the matching target files that were not processed under the second job and writing such unmatched rows of the matching target files to one or more corresponding third job resulting files. In some embodiments, the third job writes a third job resulting file for each matching target file processed by the third job. If certain unmatched rows of matching target table files are processed under the second job, then the remainder of unmatched rows of matching target table files are processed under the third job.

Figure 8:
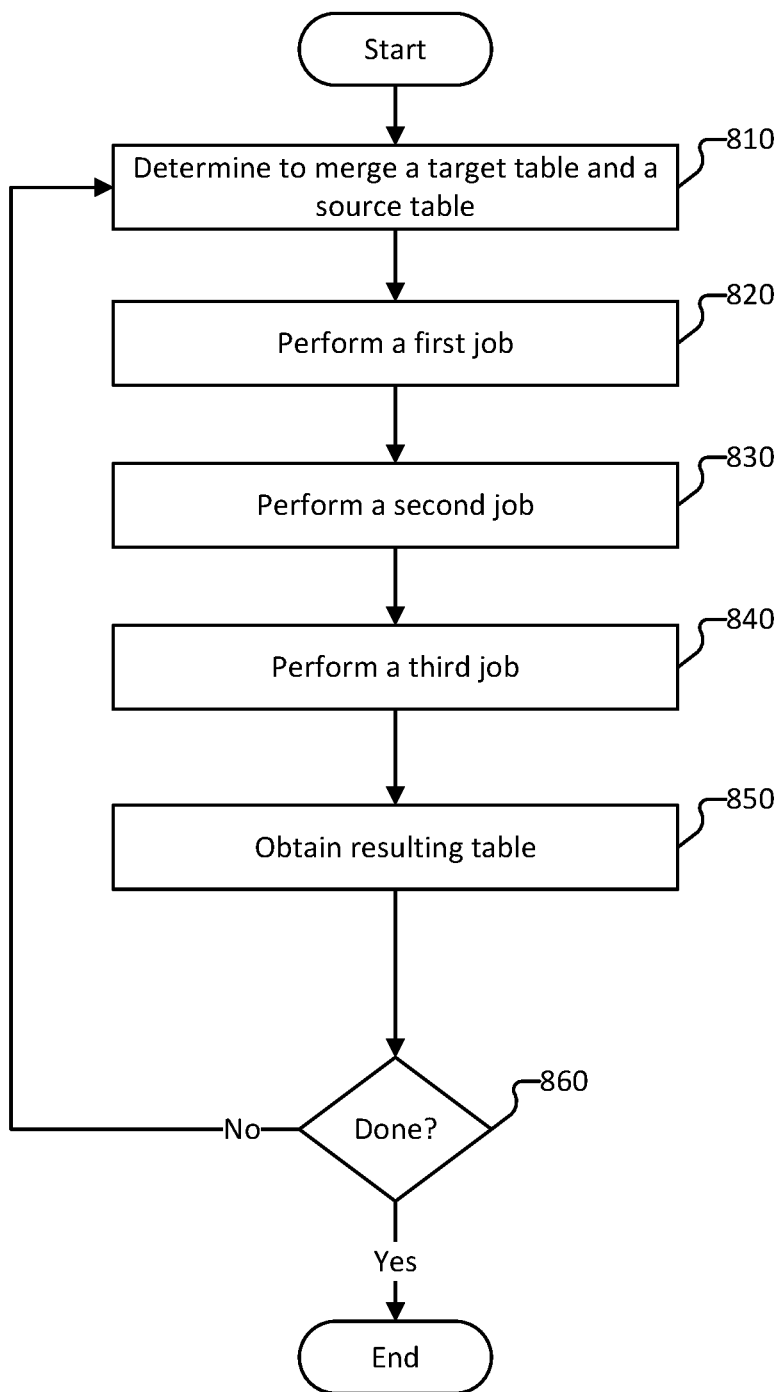
FIG. 8 is a flow diagram of a method for merging target data and source data according to various embodiments of the present application.

FIG. 8 is a flow diagram of a method for merging target data and source data according to various embodiments of the present application. In some embodiments, process 800 is implemented by data merging service 110 of system 100 of FIG. 1 and/or system 200 of FIG. 2.

At 810, a determination is made to merge a target table and a source table. The system may determine to merge the target table and the source table based on a request received from a user, or another service or system.

At 820, a first job is performed. In some embodiments, performing the first job includes invoking process 900 of FIG. 9. The system performs the first job in connection with determining the matching target table rows (e.g., the matching rows of the matching target table files and the matching source data records).

At 830, a second job is performed. In some embodiments, performing the second job includes, or is similar to, process 1000 of FIG. 10. The system performs the second job in connection with performing a matching action for matching rows of the matching target table files and the matching source data records of the source data. The system obtains one or more second job resulting files corresponding to the information for the matched rows as updated in accordance with the source data.

At 840, a third job is performed. In some embodiments, performing the third job includes, or is similar to, process 1100 of FIG. 11. The system performs the second job in connection with storing information for unmatched rows of the matching target table files. The system obtains one or more third job resulting files corresponding to the information for the unmatched rows.

At 850, a resulting table is obtained. In some embodiments, the resulting table is obtained based at least in part on the second job and the third job. For example, the resulting table is obtained based at least in part on second job resulting files and third job resulting files. The resulting table may further be obtained based on resulting files obtained from performing a fourth job and/or a fifth job, etc.

At 860, a determination is made as to whether process 800 is complete. In some embodiments, process 800 is determined to be complete in response to a determination that no further tables are to be merged, no further rows or files are to be subject to second job processing. (e.g., within a threshold period of time), no further source data is received (e.g., within a threshold period of time), a user has exited the system, an administrator indicates that process 800 is to be paused or stopped, etc. In response to a determination that process 800 is complete, process 800 ends. In response to a determination that process 800 is not complete, process 800 returns to 810.

Figure 9:
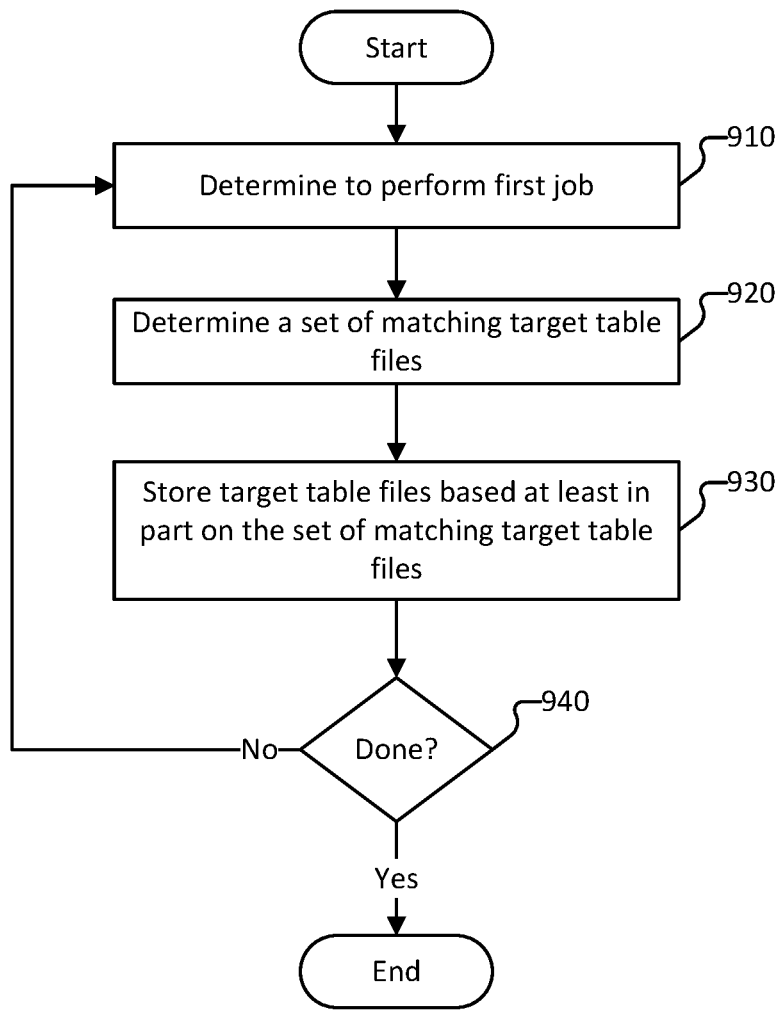
FIG. 9 is a flow diagram of a method for performing a first job in connection with merging target data and source data according to various embodiments of the present application.

FIG. 9 is a flow diagram of a method for performing a first job in connection with merging target data and source data according to various embodiments of the present application. In some embodiments, process 900 is implemented by data merging service 110 of system 100 of FIG. 1 and/or system 200 of FIG. 2. In some embodiments, process 900 is invoked by 820 of process 800 of FIG. 8.

At 910, a determination is made to perform a first job.

At 920, a set of matching target table files is determined. The system scans in the target table and the source data to determine matching target table files and/or matching rows of the matching target table files.

At 930, target table files are stored based at least part on the set of matching target table files. In response to determining the matching rows of the matching target table files, the system stores an indication of such rows (e.g., the system stores matching row identifiers), which can be obtained in connection with performing the second job or third job.

At 940, a determination is made as to whether process 900 is complete. In some embodiments, process 900 is determined to be complete in response to a determination that no further tables are to be merged, no further rows or files are to be subject to first job processing. (e.g., within a threshold period of time), no further source data is received (e.g., within a threshold period of time), a user has exited the system, an administrator indicates that process 900 is to be paused or stopped, etc. In response to a determination that process 900 is complete, process 900 ends. In response to a determination that process 900 is not complete, process 900 returns to 910.

Figure 10:
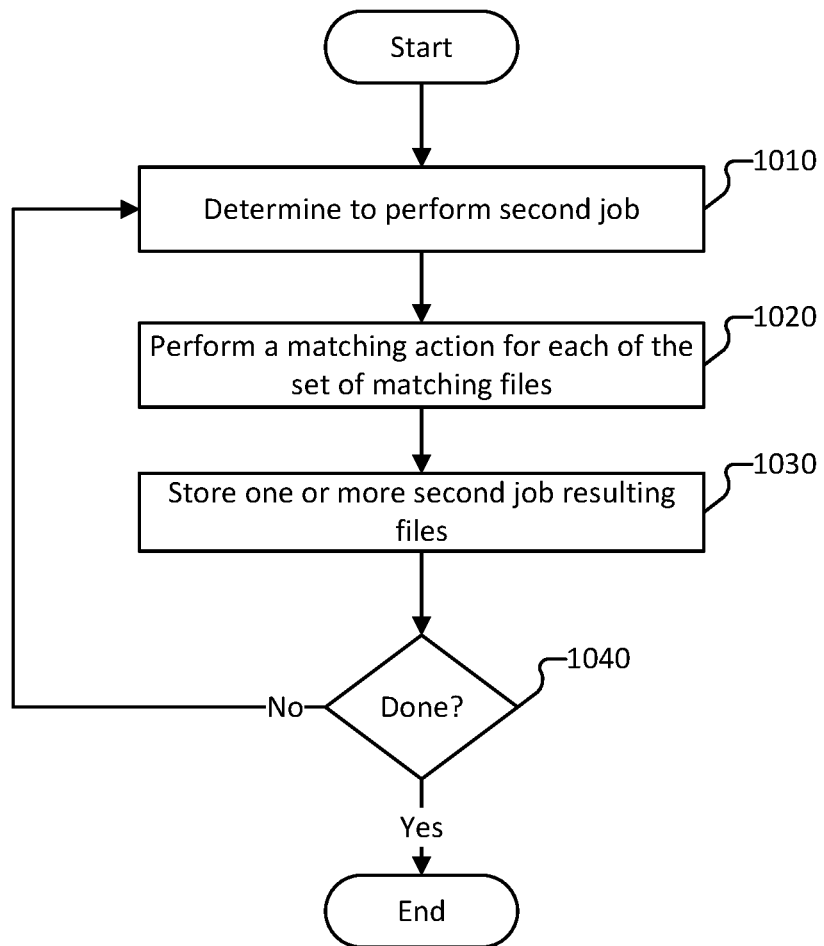
FIG. 10 is a flow diagram of a method for performing a second job in connection with merging target data and source data according to various embodiments of the present application.

FIG. 10 is a flow diagram of a method for performing a second job in connection with merging target data and source data according to various embodiments of the present application. In some embodiments, process 1000 is implemented by data merging service 110 of system 100 of FIG. 1 and/or system 200 of FIG. 2. In some embodiments, process 1000 is invoked by 830 of process 800 of FIG. 8.

At 1010, a determination is made to perform a second job.

At 1020, a matching action for each of the set of matching files is performed. In some embodiments, the system performs a merge with respect to the matching rows of matching target table files and corresponding source data records. The system obtains the identifiers of the matching rows of the matching target table files, scans such rows from the corresponding target table files and applicable source data, and performs a join operation with respect to such information.

At 1030, one or more second job resulting files are stored.

At 1040, a determination is made as to whether process 1000 is complete. In some embodiments, process 1000 is determined to be complete in response to a determination that no further tables are to be merged, no further rows or files are to be subject to second job processing. (e.g., within a threshold period of time), no further source data is received (e.g., within a threshold period of time), a user has exited the system, an administrator indicates that process 1000 is to be paused or stopped, etc. In response to a determination that process 1000 is complete, process 1000 ends. In response to a determination that process 1000 is not complete, process 1000 returns to 1010.

Figure 11:
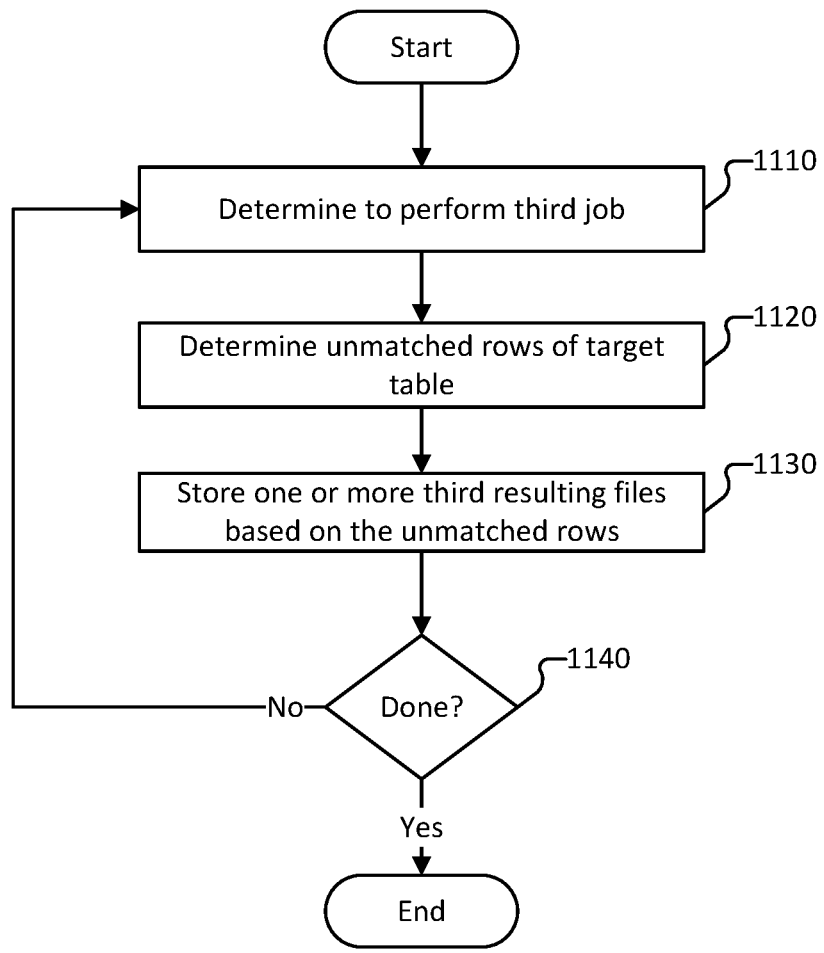
FIG. 11 is a flow diagram of a method for performing a third job in connection with merging target data and source data according to various embodiments of the present application.

FIG. 11 is a flow diagram of a method for performing a third job in connection with merging target data and source data according to various embodiments of the present application. In some embodiments, process 1100 is implemented by data merging service 110 of system 100 of FIG. 1 and/or system 200 of FIG. 2. In some embodiments, process 1100 is invoked by 840 of process 800 of FIG. 8.

At 1110, a determination is made to perform a third job.

At 1120, unmatched rows of a target table are determined. The system determines the identifiers for unmatched rows of the matching target table files and obtains the corresponding unmatched rows.

At 1130, one or more third resulting files based on the unmatched rows are stored.

At 1140, a determination is made as to whether process 1100 is complete. In some embodiments, process 1100 is determined to be complete in response to a determination that no further tables are to be merged, no further rows or files are to be subject to third job processing. (e.g., within a threshold period of time), no further source data is received (e.g., within a threshold period of time), a user has exited the system, an administrator indicates that process 1100 is to be paused or stopped, etc. In response to a determination that process 1100 is complete, process 1100 ends. In response to a determination that process 1100 is not complete, process 1100 returns to 1110.

Figure 12:
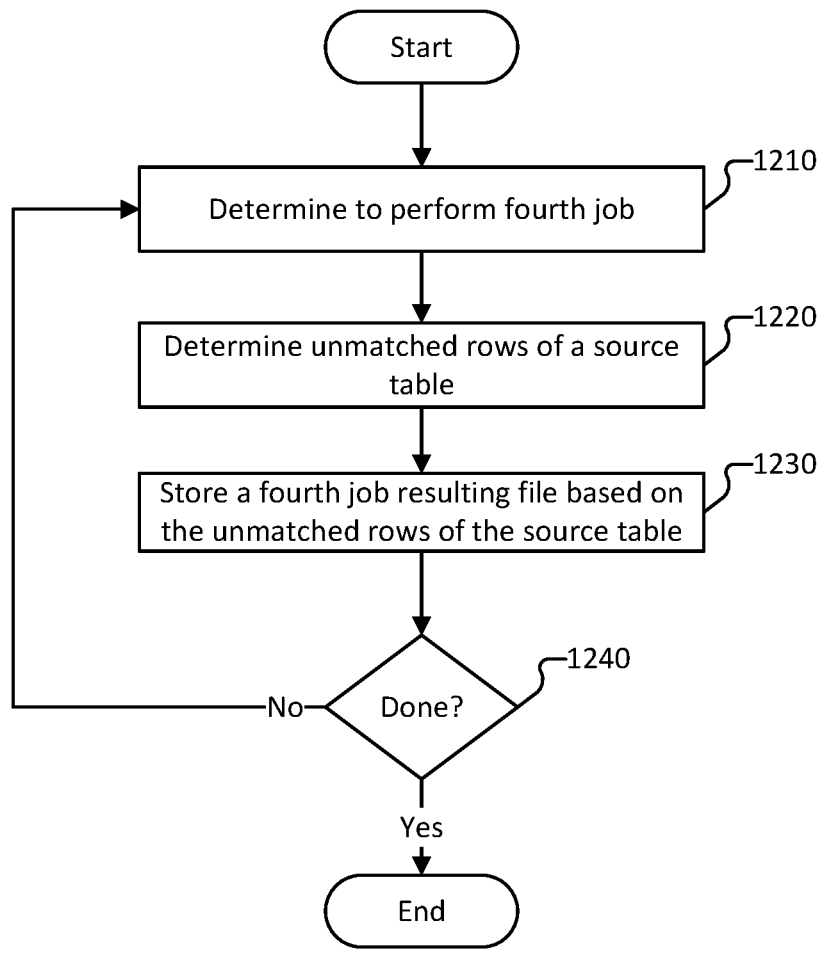
FIG. 12 is a flow diagram of a method for performing a fourth job in connection with merging target data and source data according to various embodiments of the present application.

FIG. 12 is a flow diagram of a method for performing a fourth job in connection with merging target data and source data according to various embodiments of the present application. In some embodiments, process 1200 is implemented by data merging service 110 of system 100 of FIG. 1 and/or system 200 of FIG. 2. In some embodiments, process 1200 is invoked by process 800 of FIG. 8.

At 1210, a determination is made to perform a fourth job.

At 1220, unmatched rows of a source table are determined. The system determines unmatched records for the source data, such as based on obtaining identifiers for matched records of the source data and determining a remainder of records.

At 1230, a fourth job resulting file is stored based at least in part on the unmatched rows of the source table. In some embodiments, the fourth job produces multiple resulting files.

At 1240, a determination is made as to whether process 1200 is complete. In some embodiments, process 1200 is determined to be complete in response to a determination that no further tables are to be merged, no further rows or files are to be subject to fourth job processing. (e.g., within a threshold period of time), no further source data is received (e.g., within a threshold period of time), a user has exited the system, an administrator indicates that process 1200 is to be paused or stopped, etc. In response to a determination that process 1200 is complete, process 1200 ends. In response to a determination that process 1200 is not complete, process 1200 returns to 1210.

Figure 13:
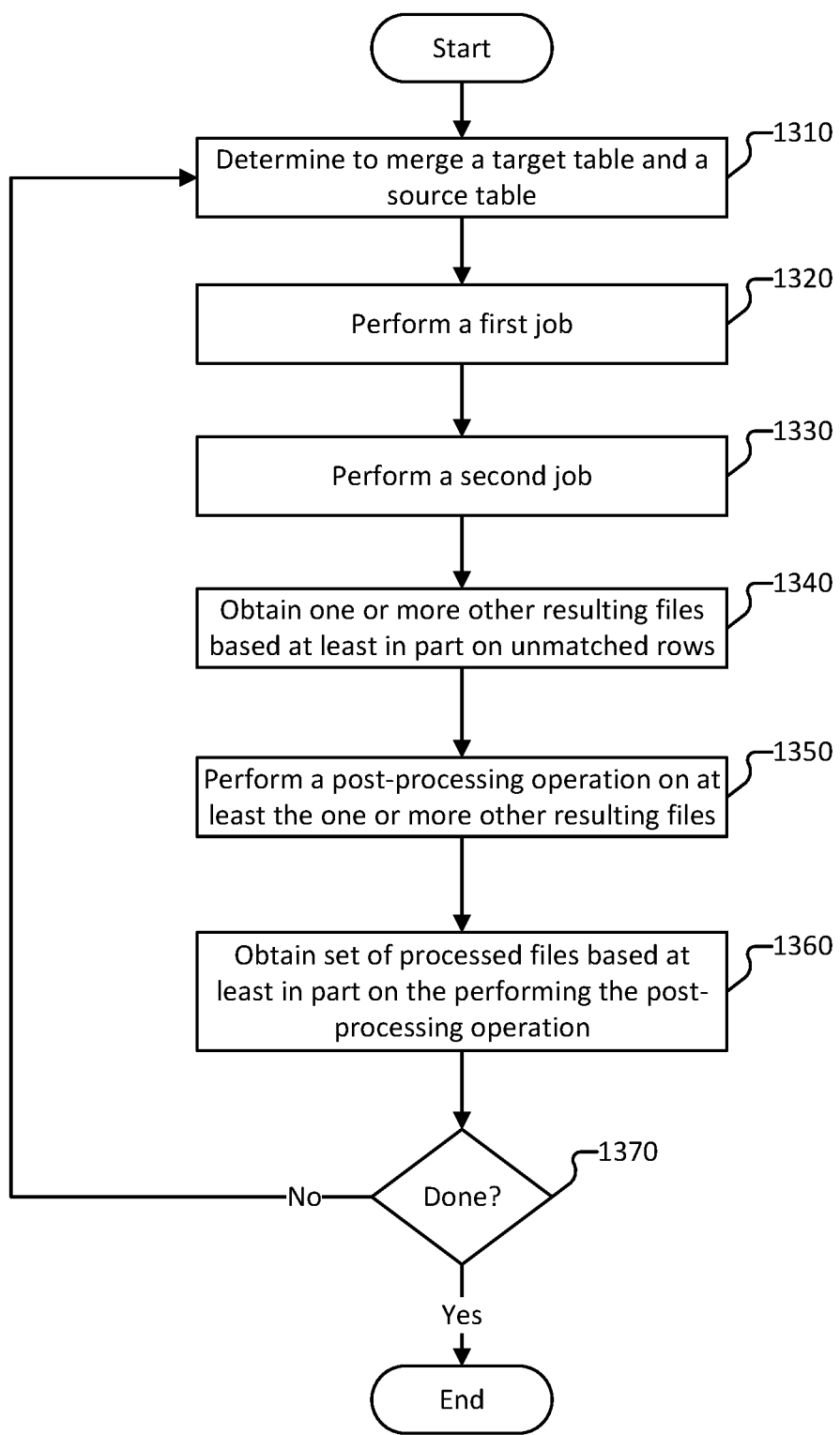
FIG. 13 is a flow diagram of a method for merging target data and source data according to various embodiments of the present application.

FIG. 13 is a flow diagram of a method for merging target data and source data according to various embodiments of the present application. In some embodiments, process 1300 is implemented by data merging service 110 of system 100 of FIG. 1 and/or system 200 of FIG. 2.

At 1310, a determination is made to merge a target table and a source table. In some embodiments, 1310 is similar to, or corresponds to 810 of process 800 of FIG. 8.

At 1320, a first job is performed. In some embodiments, performing the first job includes invoking process 900 of FIG. 9.

At 1330, a second job is performed. In some embodiments, the performing the second job includes reading at least matched rows of matching target table files based at least in part on one or more deletion vectors. In some embodiments, performing the second job includes, or is similar to, process 1000 of FIG. 10.

At 1340, one or more resulting files are obtained based at least in part on unmatched rows. The system can obtain the one or more resulting files based on performing one or more of the third job and the fourth job.

At 1350, a post-processing operation on at least the one or more resulting files. In some embodiments, although FIG. 13 includes the first job and the second job, the post processing could also apply to files produced by the third job and the fourth job. In some embodiments, performing 1350 includes invoking process 1400 of FIG. 14. The system can determine to perform the post-processing operation based at least in part on a post-processing policy such as a compaction policy. The system determines whether to perform the post-processing operation with respect to the resulting files based on one or more characteristics associated with the resulting files such as file size, etc.

At 1360, a set of processed files is obtained based at least in part on the performing the post-processing operation. In the case that the post-processing include compaction, the system obtains a compacted resulting file based on compacting two or more smaller resulting files.

At 1370, a determination is made as to whether process 1300 is complete. In some embodiments, process 1300 is determined to be complete in response to a determination that no further tables are to be merged, no further source data is received (e.g., within a threshold period of time), a user has exited the system, an administrator indicates that process 1300 is to be paused or stopped, etc. In response to a determination that process 1300 is complete, process 1300 ends. In response to a determination that process 1300 is not complete, process 1300 returns to 1310.

Figure 14:
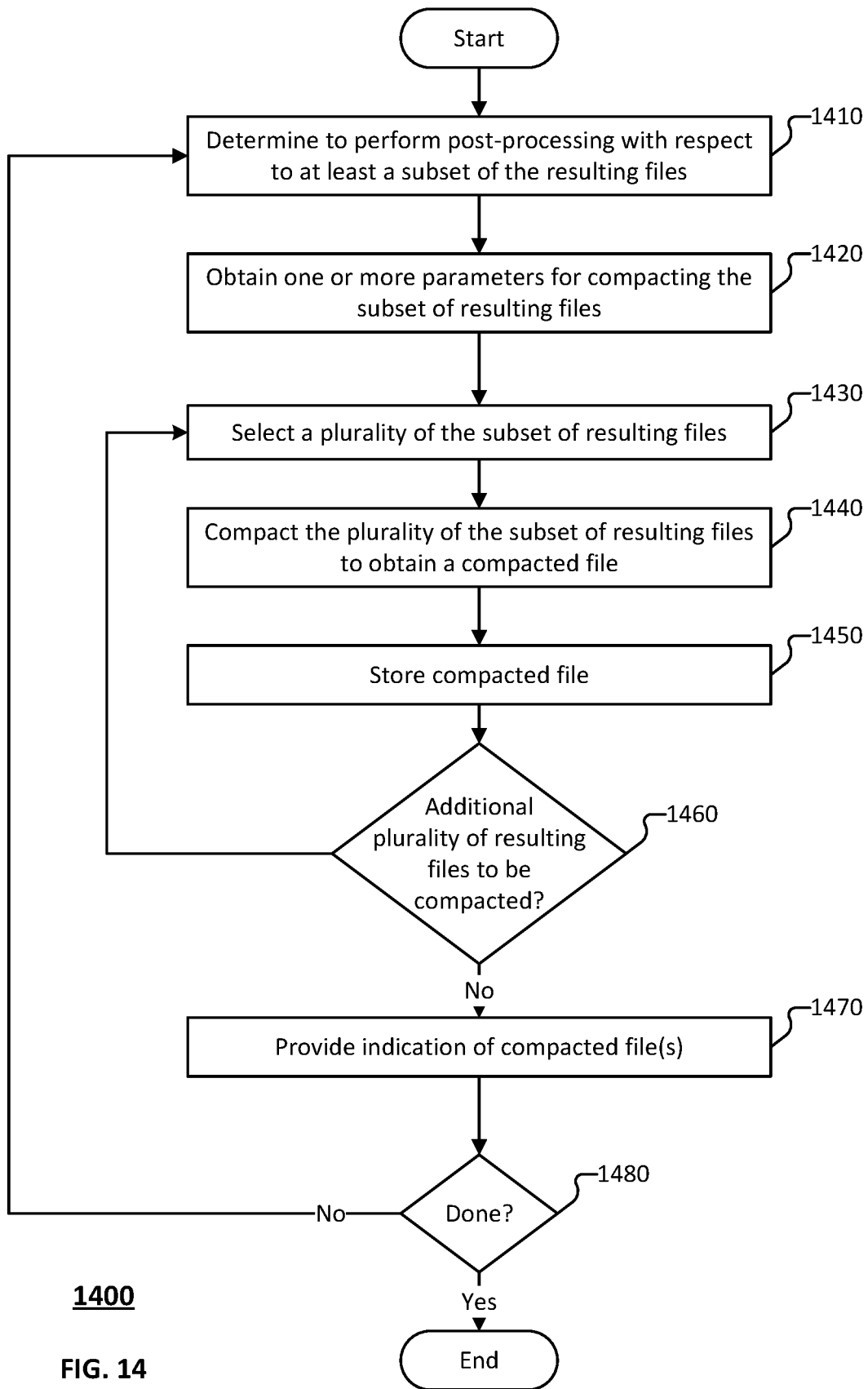
FIG. 14 is a flow diagram of a method for merging target data and source data according to various embodiments of the present application.

FIG. 14 is a flow diagram of a method for merging target data and source data according to various embodiments of the present application. In some embodiments, process 1400 is implemented by data merging service 110 of system 100 of FIG. 1 and/or system 200 of FIG. 2. In some embodiments, process 1400 is invoked by 1350 of process 1300 of FIG. 13.

At 1410, a determination is made to perform a post-processing with respect to at least a subset of the resulting files. In some embodiments, the system determines to perform the post-processing with respect to at least the subset of the resulting files based on a compaction policy and one or more characteristics associated with the subset of the resulting files (e.g., corresponding file sizes of the resulting files), etc.

At 1420, one or more parameters for compacting the subset of resulting files are obtained. The system obtains the one or more parameters based on the compaction policy. For example, the compaction policy may include rules or heuristics according to which a set of resulting files are to be compacted.

At 1430, a plurality of the subset of resulting files are selected. The system uses the one or more parameters for compacting the subset of resulting files to select the plurality of resulting files to be compacted.

At 1440, the plurality of the subset of resulting files is compacted to obtain a compacted file. The system obtains a single file comprising the information for a plurality of smaller resulting files. In some cases, the system obtains a plurality of compacted files which are each obtained based on compacting a plurality of files.

At 1450, the compacted file is stored.

At 1460, a determination is made as to whether an additional plurality of resulting files is to be compacted.

In response to determining that an additional plurality of resulting files is to be compacted at 1460, process 1400 returns to 1430 and process 1400 iterates over 1430-1460 until no further resulting files are to be compacted.

In response to determining that no additional plurality of resulting files is to be compacted at 1460, process 1400 proceeds to process 1470.

At 1470, an indication of the compacted file(s) is provided. In some embodiments, the indication of the compacted file(s) is provided to the process, services, or other system that invoked process 1400. For example, the indication of the compacted file(s) is provided to 1350 and/or 1360 or process 1300 of FIG. 13.

At 1480, a determination is made as to whether process 1400 is complete. In some embodiments, process 1400 is determined to be complete in response to a determination that no further tables are to be merged, no further resulting files are to be post-processed (e.g., within a threshold period of time), a user has exited the system, an administrator indicates that process 1400 is to be paused or stopped, etc. In response to a determination that process 1400 is complete, process 1400 ends. In response to a determination that process 1400 is not complete, process 1400 returns to 1410.

Figure 15:
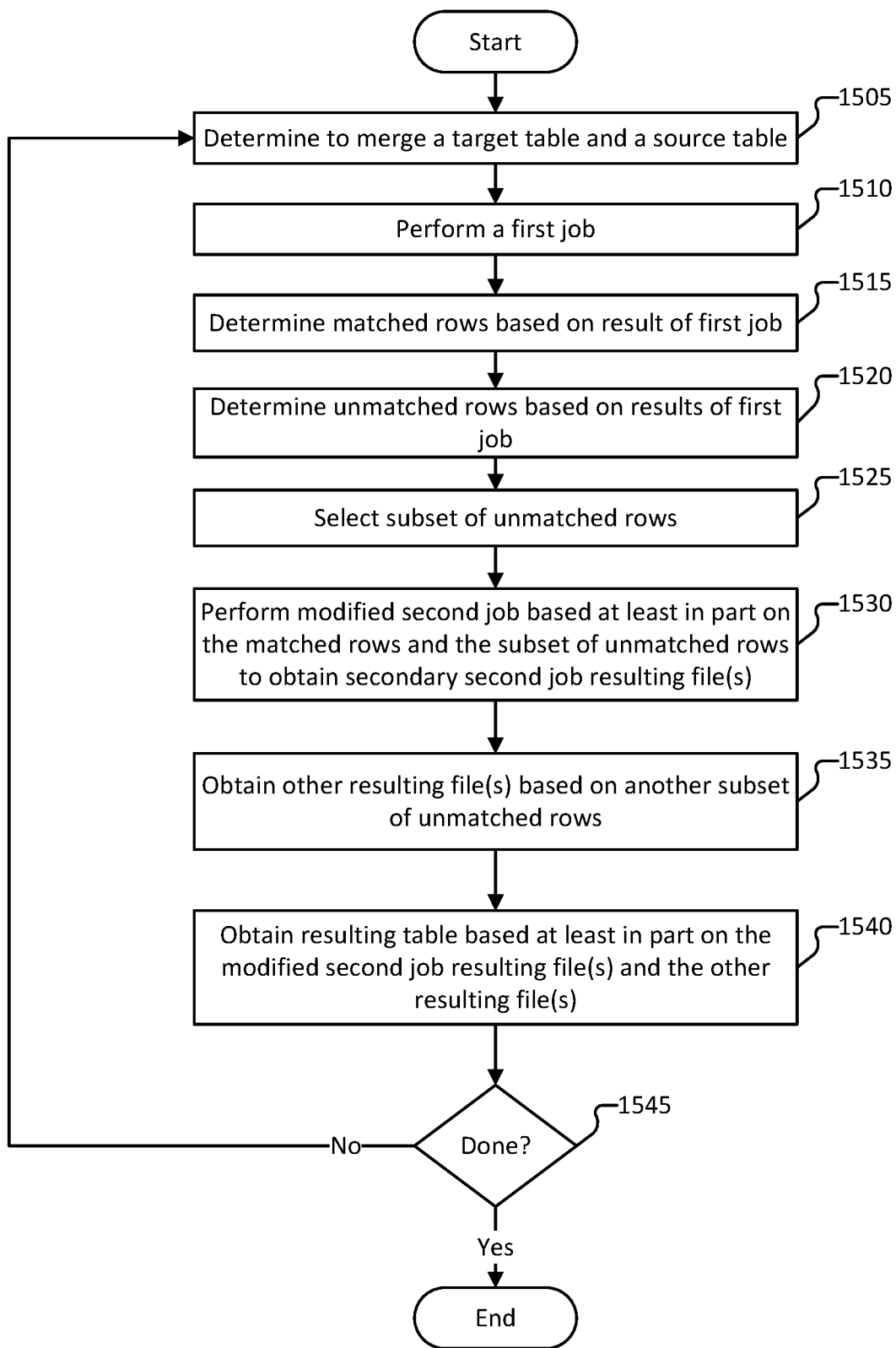
FIG. 15 is a flow diagram of a method for merging target data and source data according to various embodiments of the present application.

FIG. 15 is a flow diagram of a method for merging target data and source data according to various embodiments of the present application. In some embodiments, process 1500 is implemented by data merging service 110 of system 100 of FIG. 1 and/or system 200 of FIG. 2.

At 1505, a determination is made to merge a target table and a source table. In some embodiments, 1505 is similar to, or corresponds to 810 of process 800 of FIG. 8.

At 1510, a first job is performed. In some embodiments, performing the first job includes invoking process 1000 of FIG. 10.

At 1515, matched rows are determined based on a result of the first job. The system obtains the results of the first job and from the results obtains identifiers for the matched rows of the matching target table files.

At 1520, unmatched rows are determined based on results of the first job. The system also uses the results of the first job to determine a identifiers for unmatched rows of matching target table files.

At 1525, a subset of unmatched rows are selected. The system selects a set of unmatched rows of matching target table files to be processed under the second job (e.g., the secondary second job). For example, the system uses a mixing policy in connection with selecting the subset of unmatched rows.

At 1530, a secondary second job is performed based at least in part on the matched rows and the subset of unmatched rows to obtain secondary second job resulting file(s). In some embodiments, the system reads in the matched rows of the matching target table files and the source data, performs a join operation to merge the corresponding information, and then performs a union operation with respect to the results of the join operation and the selected subset of unmatched rows.

At 1535, other resulting files are obtained based on another subset of unmatched rows. The system can obtain the other resulting files based on performing a third job with respect to the unmatched rows of the matching target table files that are not processed under the second job. The system may also obtain other resulting files based on unmatched rows of the source table, such as by performing a fourth job.

At 1540, a resulting table is obtained based at least in part on the secondary second job resulting files and the other resulting files.

At 1545, a determination is made as to whether process 1500 is complete. In some embodiments, process 1500 is determined to be complete in response to a determination that no further tables are to be merged, no further source data is received (e.g., within a threshold period of time), a user has exited the system, an administrator indicates that process 1500 is to be paused or stopped, etc. In response to a determination that process 1500 is complete, process 1500 ends. In response to a determination that process 1600 is not complete, process 1500 returns to 1505.

Figure 16:
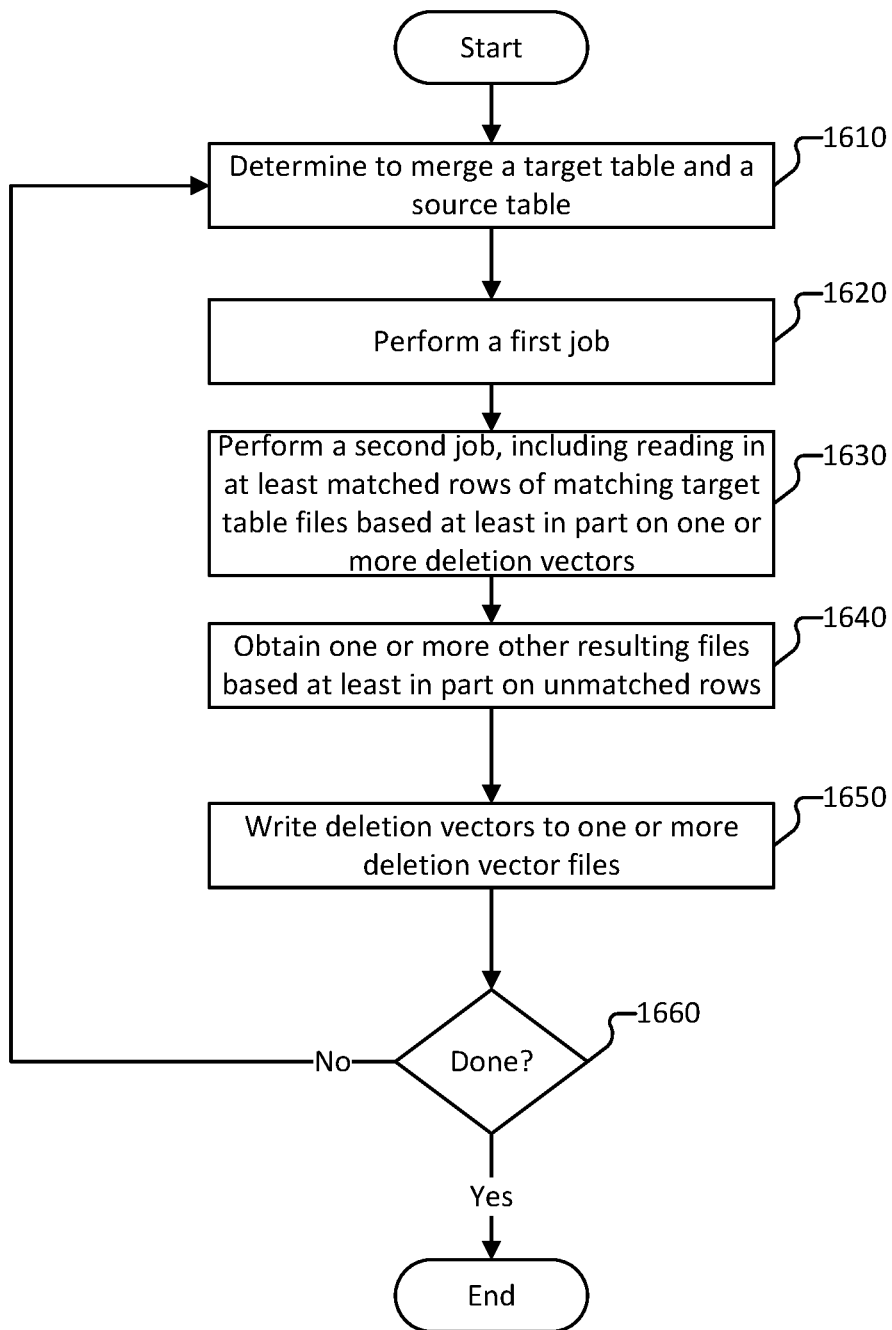
FIG. 16 is a flow diagram of a method for merging target data and source data according to various embodiments of the present application.

FIG. 16 is a flow diagram of a method for merging target data and source data according to various embodiments of the present application. In some embodiments, process 1600 is implemented by data merging service 110 of system 100 of FIG. 1 and/or system 200 of FIG. 2.

At 1610, a determination is made to merge a target table and a source table. In some embodiments, 1610 is similar to, or corresponds to 810 of process 800 of FIG. 8.

At 1620, a first job is performed. In some embodiments, performing the first job includes invoking process 900 of FIG. 9.

At 1630, a second job is performed. In some embodiments, the performing the second job includes reading at least matched rows of matching target table files based at least in part on one or more deletion vectors. In some embodiments, performing the second job includes, or is similar to, process 1000 of FIG. 10. If the system determines that the target table has corresponding deletion vectors, the system can exclude reading rows corresponding to the deletion vectors as part of the second job.

At 1640, one or more resulting files are obtained based at least in part on unmatched rows. The system can obtain the one or more resulting files by performing other jobs, such as a third job (e.g., to process unmatched rows of matching target table files) and a fourth job (e.g., to process unmatched records of the source data), etc.

At 1650, deletion vectors are written to one or more deletion vector files. In some embodiments, performing 1650 includes invoking process 1700 of FIG. 17. In some embodiments, the deletion vectors are written to the one or more deletion vector files based on a deletion vector policy.

At 1660, a determination is made as to whether process 1600 is complete. In some embodiments, process 1600 is determined to be complete in response to a determination that no further tables are to be merged, no further source data is received (e.g., within a threshold period of time), a user has exited the system, an administrator indicates that process 1600 is to be paused or stopped, etc. In response to a determination that process 1600 is complete, process 1600 ends. In response to a determination that process 1600 is not complete, process 1600 returns to 1610.

Figure 17:
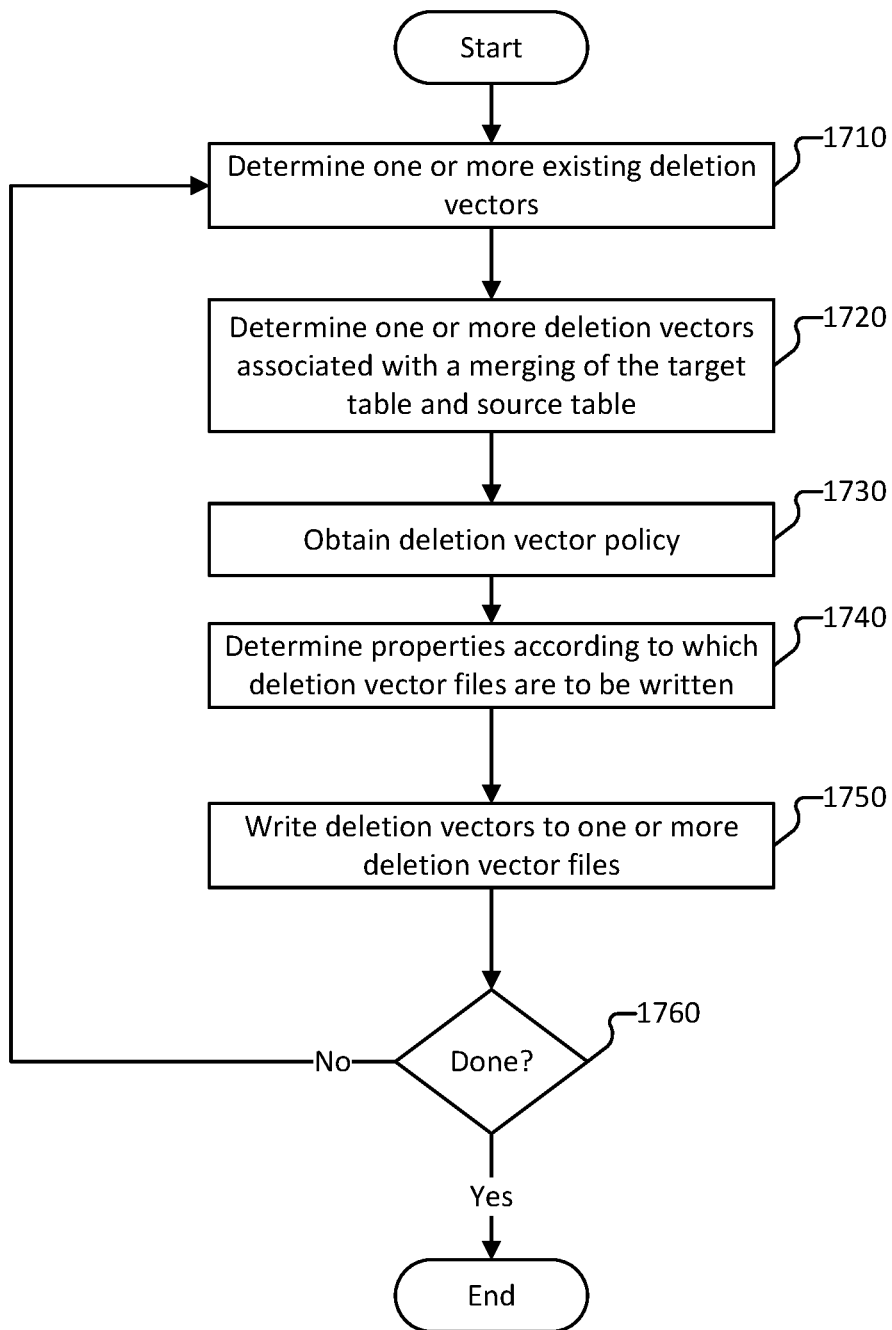
FIG. 17 is a flow diagram of a method for persisting deletion vectors according to various embodiments of the present application.

FIG. 17 is a flow diagram of a method for persisting deletion vectors according to various embodiments of the present application. In some embodiments, process 1700 is implemented by data merging service 110 of system 100 of FIG. 1 and/or system 200 of FIG. 2. In some embodiments, process 1700 is invoked by 1650 of process 1600 of FIG. 16.

At 1710, one or more existing deletion vectors are determined. The system can determine the deletion vectors based on metadata associated with the target table and/or the merge operation.

At 1720, one or more deletion vectors associated with a merging of the target table and the source table are determined.

At 1730, a deletion vector policy is obtained.

At 1740, properties according to which deletion vectors files are to be written are determined. The system uses the deletion vector policy to determine a manner by which the deletion vector files are to be stored across one or more deletion vector files. For example, the properties can include a number of deletion vector files, a maximum size of deletion vector files, a minimum size of deletion vector files, etc.

At 1750, deletion vectors are written to one or more deletion vector files.

At 1760, a determination is made as to whether process 1700 is complete. In some embodiments, process 1700 is determined to be complete in response to a determination that no further tables are to be merged, no further deletion vectors are to be persisted (e.g., within a threshold period of time), no further deletion vectors exist, a user has exited the system, an administrator indicates that process 1700 is to be paused or stopped, etc. In response to a determination that process 1700 is complete, process 1700 ends. In response to a determination that process 1700 is not complete, process 1700 returns to 1710.

Figure 18:
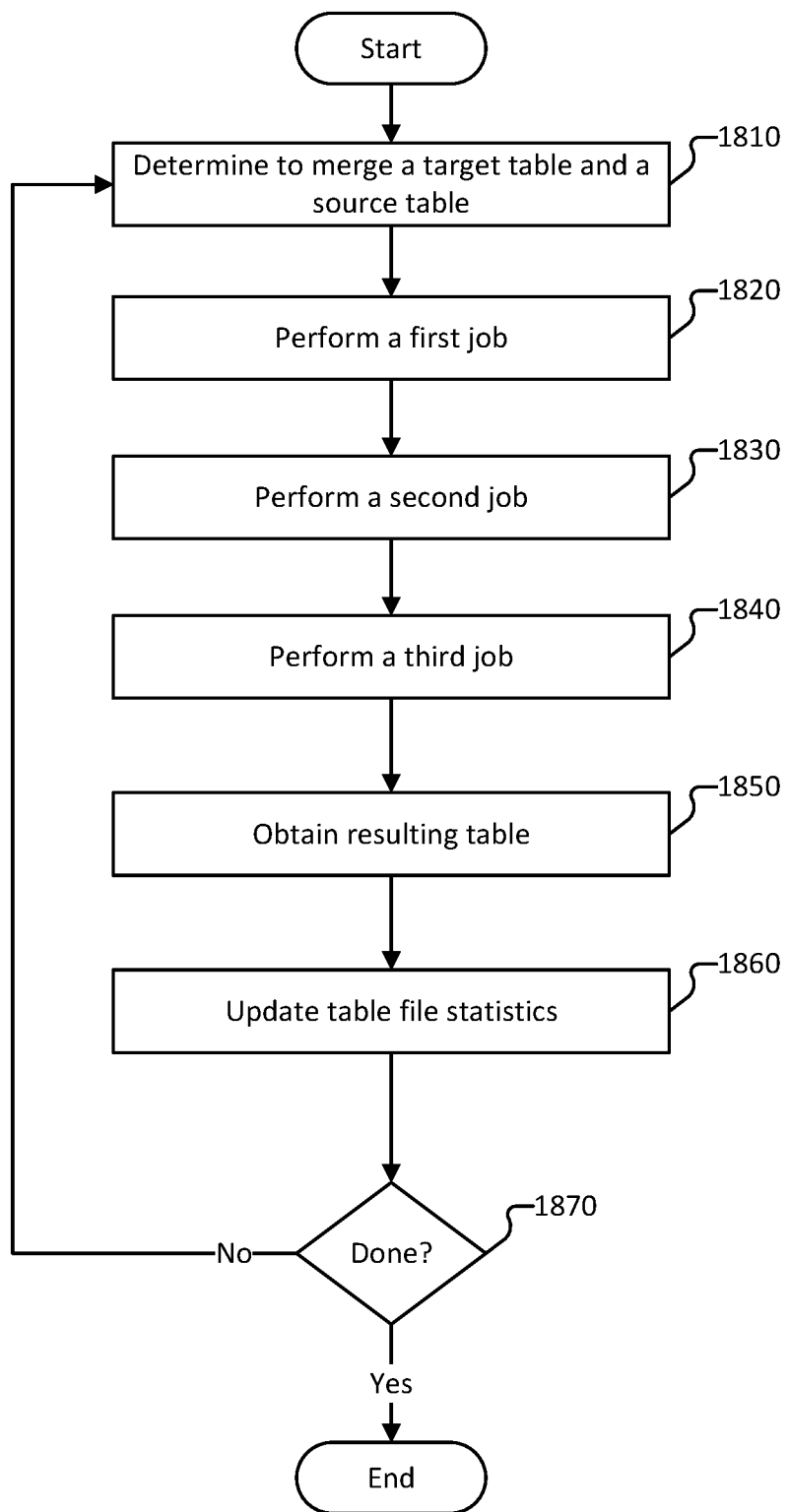
FIG. 18 is a flow diagram of a method for merging target data and source data according to various embodiments of the present application.

FIG. 18 is a flow diagram of a method for merging target data and source data according to various embodiments of the present application. In some embodiments, process 1800 is implemented by data merging service 110 of system 100 of FIG. 1 and/or system 200 of FIG. 2.

At 1810, a determination to merge a target table and a source table is made. In some embodiments, 1810 is similar to, or corresponds to, 810 of process 800 of FIG. 8.

At 1820, a first job is performed. In some embodiments, performing the first job includes invoking process 900 of FIG. 9.

At 1830, a second job is performed. In some embodiments, performing the second job includes invoking process 1000 of FIG. 10.

At 1840, a third job is performed. In some embodiments, performing the third job includes invoking process 1100 of FIG. 11.

At 1850, a resulting table is obtained.

At 1860, table file statistics are updated. In some embodiments, the system determines that the statistics for the files corresponding to the resulting table are invalid or inaccurate, such as based on a deletion vector changing a minimum value, a maximum value, a null value for a column, etc. In response to determining that the statistics are invalid or inaccurate, the system determines to perform a post-processing to update the statistics for the files.

At 1870, a determination is made as to whether process 1800 is complete. In some embodiments, process 1800 is determined to be complete in response to a determination that no further tables are to be merged, no further source data is received (e.g., within a threshold period of time), a user has exited the system, an administrator indicates that process 1800 is to be paused or stopped, etc. In response to a determination that process 1800 is complete, process 1800 ends. In response to a determination that process 1800 is not complete, process 1800 returns to 1810.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors; and
memory, the memory storing instructions that, when executed by the one or more processors, cause the one or more processors to:
determine to merge a target table and a source table, wherein the source table stores data in a set of source table files, wherein each source table file stores one or more records of the source table and the target table stores data in a set of target table files, wherein each target table file stores one or more records of the target table; and
in response to determining to merge the target table and the source table, perform a first job, wherein performing the first job comprises:
determining a set of matching target table files comprising one or more target table files for which the source table has one or more matching source table records; and
storing target table information indicating (i) the set of matching target table files, and (ii) for each of the set of matching target table files, a particular set of rows having matching rows in the one or more matching source table records;
perform a second job, wherein performing the second job comprises:
for each matching target table file of the set of matching target table files, performing a matching action based at least in part on (i) the particular set of rows comprised in the matching target table file, and (ii) matching rows in the one or more matching source table records corresponding to the particular set of rows comprised in the matching target table file; and
obtaining one or more second job resulting files based on the matching action;
perform a third job, wherein performing the third job comprises:
determining unmatched rows for target table files that fail to match rows in source table records;
storing the unmatched rows for the target table files that fail to match rows in the source table records in one or more third job resulting files; and
for each file of the one or more third job resulting files that exceeds a file size threshold: (i) determining whether the file supports concurrent reading of chunks that are subsets of the file by a plurality of compute resources; and (ii) in response to determining that the file supports the concurrent reading of chunks, causing the plurality of compute resources to read different chunks of the file in parallel to expedite processing of the file; and
merge the target table and the source table to obtain a resulting table based at least in part on the one or more second job resulting files and the one or more third job resulting files.

2. The system of claim 1, wherein a target key column of the target table and a source key column of the source table are used to determine the set of matching target table files.

3. The system of claim 1, wherein the one or more target table files respectively comprise a plurality of rows.

4. The system of claim 1, wherein the instructions that cause the one or more processors to perform the first job further comprise instructions that cause the one or more processors to:
determine, for files of the target table that correspond to the set of matching target table files, one or more rows having matching entries with one or more rows for corresponding files of the source table.

5. The system of claim 1, wherein the one or more target table files correspond to rows of the target table.

6. The system of claim 1, wherein one or more files of the resulting table collectively maintain a file clustering characteristic for files of the target table.

7. The system of claim 1, wherein the memory further comprises instructions that cause the one or more processors to:

determine whether source information comprises a plurality of rows that are keyed to at least a subset of rows of the one or more target table files; and in response to determining that the source information comprises the plurality of rows that are keyed to at least the subset of rows of the one or more target table files, use the source information as the source table to be merged with the target table.

8. The system of claim 1, wherein the memory further comprises instructions that cause the one or more processors to:

determine whether source information comprises a plurality of files that are not keyed to at least a subset of files of the target table; and in response to determining that the source information does not include the plurality of files that are not keyed to at least the subset of files of the target table, generate the source table based at least in part on the source information.

9. The system of claim 1, wherein the memory further comprises instructions that cause the one or more processors to:

log changes made to rows of the one or more target table files in connection with merging the target table and the source table.

10. The system of claim 9, wherein the instructions that cause the one or more processors to log the changes to rows comprise instructions that cause the one or more processors to store a manner by which the one or more target table files, or rows of the one or more target table files are changed during the merge of the target table and the source table.

11. The system of claim 1, wherein the matching action performed in connection with performing the second job comprises performing a join operation between (i) the particular set of rows comprised in the matching target table file identified in the second job, and (ii) matching rows in the one or more matching source table files corresponding to the particular set of rows comprised in the matching target table file identified in the second job.

12. The system of claim 11, wherein the join operation is not performed with respect to unmatched rows of the set of matching target table files for which the matching source table files do not have matching rows.

13. The system of claim 1, wherein the unmatched rows for target table files that do not have corresponding matching rows in the source table records are determined based at least in part on the information indicating (i) the set of matching target table files, and (ii) for each of the set of matching target table files, the particular set of rows having matching rows in the one or more matching source table files.

14. The system of claim 1, wherein the one or more third job resulting files comprise one or more unmatched rows from the set of matching target table files for which the one or more matching source table files do not have one or more matching rows.

15. The system of claim 1, wherein the instructions that cause the one or more processors to perform the first job further further comprise instructions that cause the one or more processors to:

store source table information indicating a particular set of rows of source table records for which the target table does not include target table files having a matching set of rows.

16. The system of claim 15, wherein the one or more processors are further configured to:

perform a fourth job, wherein performing the fourth job comprises:

storing in one or more fourth job resulting files the particular set of rows of source table records for which the target table does not include target table files having a matching set of rows.

17. The system of claim 1, wherein an indication of the set of matching rows is stored in a bitmap.

18. A method, comprising:

determining to merge a target table and a source table, wherein the source table stores data in a set of source table files, wherein each source table file stores one or more records of the source table and the target table stores data in a set of target table files, wherein each target table file stores one or more records of the target table; and in response to determining to merge the target table and the source table, performing a first job, wherein performing the first job comprises:

determining a set of matching target table files comprising one or more target table files for which the source table has one or more matching source table records; and storing target table information indicating (i) the set of matching target table files, and (ii) for each of the set of matching target table files, a particular set of rows having matching rows in the one or more matching source table records;

performing a second job, wherein performing the second job comprises:

for each matching target table file of the set of matching target table files, performing a matching action based at least in part on (i) the particular set of rows comprised in the matching target table file, and (ii) matching rows in the one or more matching source table records corresponding to the particular set of rows comprised in the matching target table file; and obtaining one or more second job resulting files based on the matching action;

performing a third job, wherein performing the third job comprises:

determining unmatched rows for target table files that fail to match rows in files of the source table;

storing the unmatched rows for the target table files that fail to match rows in the source table records in one or more third job resulting files; and for each file of the one or more third job resulting files that exceeds a file size threshold: (i) determining whether the file supports concurrent reading of chunks that are subsets of the file by a plurality of compute resources; and (ii) in response to determining that the file supports the concurrent reading of chunks, causing the plurality of compute resources to read different chunks of the file in parallel to expedite processing of the file; and merging the target table and the source table to obtain a resulting table based at least in part on the one or more second job resulting files and the one or more third job resulting files.

19. A computer program product embodied in a non-transitory computer readable medium and comprising computer instructions that cause one or more processors to:

determine to merge a target table and a source table, wherein the source table has one or more files that are different from one or more files in the target table; and in response to determining to merge the target table and the source table, perform a first job, wherein performing the first job causes the one or more processors to:

determine a set of matching target table files comprising the one or more target table files for which the source table has one or more matching source table files; and store target table information indicating (i) the set of matching target table files, and (ii) for each of the set of matching target table files, a particular set of rows having matching rows in the one or more matching source table files;

perform a second job, wherein performing the second job causes the one or more processors to:

for each of the set of matching target table files, perform a matching action based at least in part on (i) the particular set of rows comprised in the matching target table files, and (ii) matching rows in the one or more matching source table files; and obtain one or more second job resulting files based on the matching action;

perform a third job, wherein performing the third job causes the one or more processors to:

determine unmatched rows for target table files that do not have corresponding matching rows in source table records;

store the unmatched rows for the target table files that do not have corresponding matching rows in the source table records in one or more third job resulting files; and for each file of the one or more third job resulting files that exceeds a file size threshold: (i) determine whether the file supports concurrent reading of chunks that are subsets of the file by a plurality of compute resources; and (ii) in response to determining that the file supports the concurrent reading of chunks, cause the plurality of compute resources to read different chunks of the file in parallel to expedite processing of the file; and merge the target table and the source table to obtain a resulting table based at least in part on the one or more second job resulting files and the one or more third job resulting files.

* * * * *

UNITED STATES PATENT AND TRADEMARK OFFICE
CERTIFICATE OF CORRECTION

Page 1 of 1

PATENT NO. : 12,353,843 B2
APPLICATION NO. : 17/895872
DATED : July 8, 2025
INVENTOR(S) : Samwel et al.

It is certified that error appears in the above-identified patent and that said Letters Patent is hereby corrected as shown below:

In the Claims

In Column 41, in Claim 15, Line 58, delete "further further" and insert -- further --, therefor.

Signed and Sealed this
Ninth Day of September, 2025

Coke Morgan Stewart
*Acting Director of the United States Patent and Trademark Office*